United States Patent
Lim et al.

(10) Patent No.: US 12,119,970 B2
(45) Date of Patent: Oct. 15, 2024

(54) TECHNIQUE FOR TRANSMITTING INFORMATION ON MIDAMBLE IN WIRELESS COMMUNICATION SYSTEM

(71) Applicant: LG ELECTRONICS INC., Seoul (KR)

(72) Inventors: Dongguk Lim, Seoul (KR); Jinsoo Choi, Seoul (KR); Eunsung Park, Seoul (KR); Insun Jang, Seoul (KR)

(73) Assignee: LG ELELCTRONICS INC., Seoul (KR)

( * ) Notice: Subject to any disclaimer, the term of this patent is extended or adjusted under 35 U.S.C. 154(b) by 348 days.

(21) Appl. No.: 17/597,567

(22) PCT Filed: Jul. 10, 2020

(86) PCT No.: PCT/KR2020/009103
§ 371 (c)(1),
(2) Date: Jan. 11, 2022

(87) PCT Pub. No.: WO2021/010674
PCT Pub. Date: Jan. 21, 2021

(65) Prior Publication Data
US 2022/0158881 A1    May 19, 2022

(30) Foreign Application Priority Data

Jul. 12, 2019  (KR) .................. 10-2019-0084770
Sep. 10, 2019  (KR) .................. 10-2019-0112406
Sep. 11, 2019  (KR) .................. 10-2019-0113148

(51) Int. Cl.
*H04L 27/26* (2006.01)
*H04L 5/00* (2006.01)
(Continued)

(52) U.S. Cl.
CPC ........ *H04L 27/2602* (2013.01); *H04L 5/0044* (2013.01); *H04L 5/0053* (2013.01);
(Continued)

(58) Field of Classification Search
CPC . H04L 27/2602; H04L 5/0044; H04L 5/0053; H04L 1/0003; H04L 1/0025;
(Continued)

(56) References Cited

U.S. PATENT DOCUMENTS 8,428,172 B2    4/2013  Chun et al.
11,044,132 B2*  6/2021  Yu ....................... H04L 27/2607
(Continued)

FOREIGN PATENT DOCUMENTS

CN    107113833    8/2017
CN    108737054    11/2018
(Continued)

OTHER PUBLICATIONS

European Patent Office Application Serial No. 20840897.1, Search Report dated Jun. 30, 2022, 8 pages.
(Continued)

*Primary Examiner* — Afshawn M Towfighi
(74) *Attorney, Agent, or Firm* — LEE, HONG, DEGERMAN, KANG & WAIMEY

(57) ABSTRACT

One embodiment according to the present specification relates to a technique for transmitting information on a midamble in a wireless LAN (WLAN) system. A transmitting STA may generate a NGV PPDU. The NGV PPDU may include a preamble, a data field and a midamble. The preamble may include information on the midamble. For example, the information on the midamble may include information on the configuration and period of the midamble.

9 Claims, 30 Drawing Sheets

(a)

(b)

(51) Int. Cl.
  *H04W 4/40* (2018.01)
  *H04W 80/02* (2009.01)
  *H04W 84/12* (2009.01)
(52) U.S. Cl.
  CPC .............. *H04W 4/40* (2018.02); *H04W 80/02* (2013.01); *H04W 84/12* (2013.01)
(58) Field of Classification Search
  CPC . H04L 1/0075; H04L 5/0048; H04L 27/2613; H04L 27/26025; H04L 27/2603; H04L 5/001; H04L 5/0082; H04L 27/2666; H04W 4/40; H04W 80/02; H04W 84/12
  See application file for complete search history.

(56) References Cited

U.S. PATENT DOCUMENTS

| | | | |
|---|---|---|---|
| 2011/0026627 A1 | 2/2011 | Chun et al. | |
| 2013/0230120 A1 | 9/2013 | Yang et al. | |
| 2019/0097857 A1 | 3/2019 | Zhang et al. | |
| 2019/0173710 A1 | 6/2019 | Cao et al. | |
| 2019/0261352 A1* | 8/2019 | Cariou | H04L 5/0053 |
| 2019/0268739 A1* | 8/2019 | Cariou | H04L 27/2603 |
| 2021/0014018 A1* | 1/2021 | Noh | H04L 5/0042 |
| 2022/0104243 A1* | 3/2022 | Kim | H04L 67/61 |

FOREIGN PATENT DOCUMENTS

| | | |
|---|---|---|
| CN | 109428704 | 3/2019 |
| WO | 2019042210 | 3/2019 |
| WO | 2019112721 | 6/2019 |

OTHER PUBLICATIONS

Japan Patent Office Application Serial No. 2022-501176, Office Action dated Jan. 31, 2023, 5 pages.
Prashant Sharma, et al., "Midamble Compression", doc.: IEEE 802.11-19/0685r2, May 2019, 10 pages.
The State Intellectual Property Office of the People's Republic of China Application Serial No. 202080053603.1, Office Action dated Jul. 26, 2023, 6 pages.
PCT International Application No. PCT/KR2020/009103, International Search Report dated Oct. 13, 2020, 2 pages.
Lim, et al., "PHY designs for 11bd," IEEE 802.11-19/332r2, Mar. 2019, 24 pages.
Noh, et al., "PHY designs for NGV," IEEE 802.11-19/0293r1, Mar. 2019, 21 pages.
Lim, et al., "PPDU Format for 11bd," IEEE 802.11-19/739r3, May 2019, 20 pages.

* cited by examiner

FIG. 1
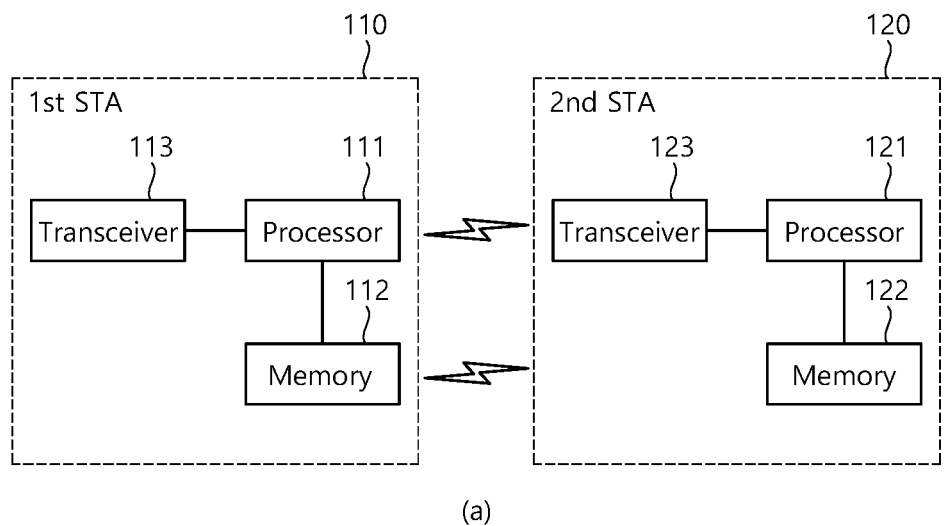
(a)
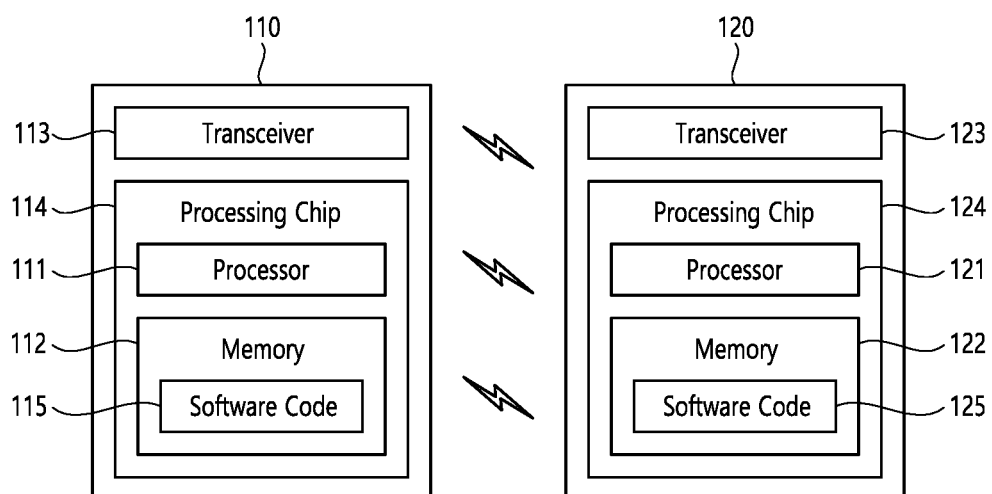
(b)

FIG. 2
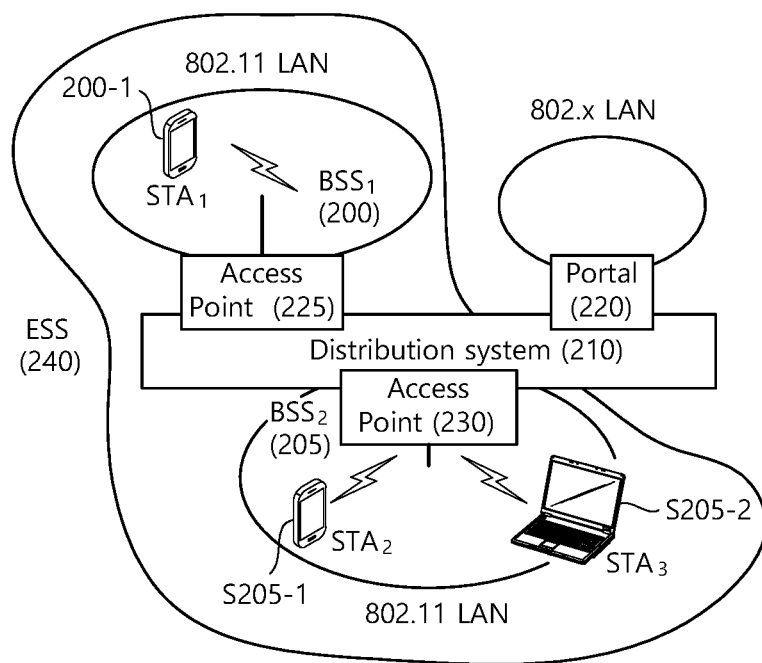
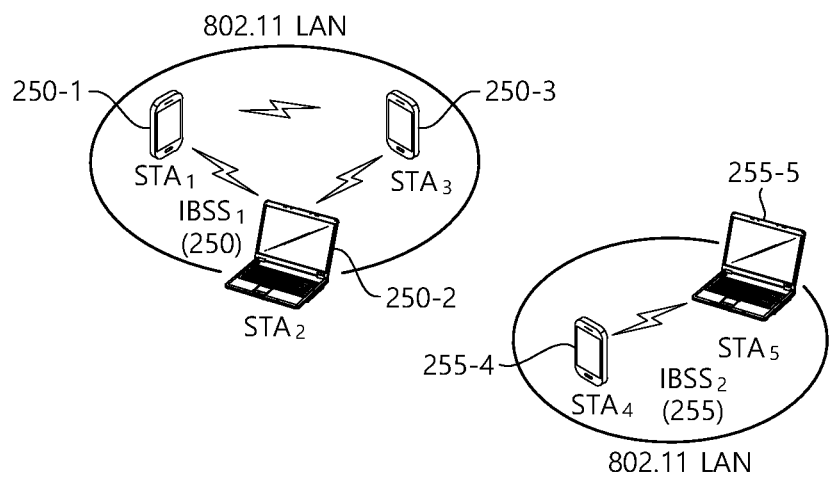

TECHNIQUE FOR TRANSMITTING INFORMATION ON MIDAMBLE IN WIRELESS COMMUNICATION SYSTEM

CROSS-REFERENCE TO RELATED APPLICATIONS

This application is the National Stage filing under 35 U.S.C. 371 of International Application No. PCT/KR2020/009103, filed on Jul. 10, 2020, which claims the benefit of earlier filing date and right of priority to Korean Patent Application No(s). 10-2019-0084770, filed on Jul. 12, 2019, 10-2019-0112406, filed on Sep. 10, 2019, and 10-2019-0113148, filed on Sep. 11, 2019, the contents of which are all incorporated by reference herein in their entirety.

BACKGROUND

Field of the Disclosure

The present specification relates to a technique for transmitting midamble information in a wireless LAN system, and more particularly, to a method for transmitting information related to the midamble of an NGV PPDU in a wireless LAN system and an apparatus supporting the same.

Related Art

Wireless network technologies may include various types of wireless local area networks (WLAN). WLAN may be used for interconnecting neighboring devices by adopting networking protocols that are extensively used. The various technical features that are described in this specification may be applied to a random communication standard, such as Wi-Fi, or more generally, any one of the IEEE 802.11 wireless protocol group.

The present specification either enhances the conventional (or existing) IEEE 802.11p specification or proposes technical characteristics that can be used in a new communication standard. The new communication standard may be a Next Generation Vehicular/V2x (NGV) standard, which is currently being discussed.

More specifically, in order to support 2× throughput enhancement, coverage extension, and high speed in comparison with the 802.11p standard system (e.g., DSRC system) in a 5.9 GHz band, the development of the NGV standard (i.e., 802.11bd standard) is being carried out.

SUMMARY

In the NGV standard (i.e., 802.11bd standard), a wide bandwidth (20 MHz) transmission is being considered instead of the conventional 10 MHz transmission to improve 2× throughput. In addition, the NGV standard should support operations such as interoperability/backward compatibility/coexistence with the existing 802.11p standard.

A signal according to the NGV standard may be transmitted in a high-speed environment. Accordingly, reception performance may be deteriorated due to the influence of Doppler (or Doppler shift). Accordingly, an STA supporting the NGV standard (i.e., an NGV STA) may use a midamble for channel estimation. According to the NGV standard, an effect of reducing the influence on Doppler through the midamble can be achieved. In order to reduce performance degradation in such a high-speed environment, the midamble may be transmitted using various configurations and periodicities.

Accordingly, a signaling method for indicating information related to the configuration and transmission periodicity of the midamble may be required.

A transmitting STA, according to various embodiments, may perform: generating a Next Generation V2X Physical Protocol Data Unit (NGV PPDU), wherein the NGV PPDU includes a preamble, a data field contiguous to the preamble, and a midamble contiguous to the data field, wherein the preamble includes a legacy signal field, a repeated signal field in which the legacy signal field is repeated, an NGV signal field including control information for the NGV PPDU, and an NGV long training field (LTF) for channel estimation of the NGV PPDU, wherein the NGV signal field includes 1-bit information related to a format of the midamble and 2-bit information related to a transmission periodicity of the midamble, wherein a format of the midamble is determined as one of a first format related to an LTF sequence of a first interval and a second format related to an LTF sequence of a second interval, wherein the format of the midamble is determined as a same format of the NGV LTF, wherein the transmission periodicity of the midamble is determined in a unit of symbols of the data field; and transmitting the NGV PPDU.

TECHNICAL EFFECTS OF THE DISCLOSURE

The present specification proposes technical features supporting a situation in which a 5.9 GHz band is used in various WLAN systems (e.g., IEEE 802.11bd systems). Based on various examples of the present specification, throughput improvement and high speed of Dedicated Short Range Communication (DSRC) (802.11p) may be supported for smooth V2X support in the 5.9 GHz band.

According to an example of the present specification, there is an effect of preventing performance degradation due to Doppler movement through the configuration of the midamble in a high-speed situation.

According to an example of the present specification, the preamble of the NGV PPDU may include information related to the midamble. Specifically, the preamble of the NGV PPDU may include information related to the configuration and periodicity of the midamble. Accordingly, the transmitting STA may transmit the NGV PPDU by including information related to the configuration and periodicity of the midamble in the preamble of the NGV PPDU (e.g., NGV-SIG). The transmitting STA may transmit the NGV PPDU in various channel conditions by changing the configuration and period of the midamble based on the channel condition to transmit the NGV PPDU.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

DESCRIPTION OF EXEMPLARY EMBODIMENTS

Figure 3:
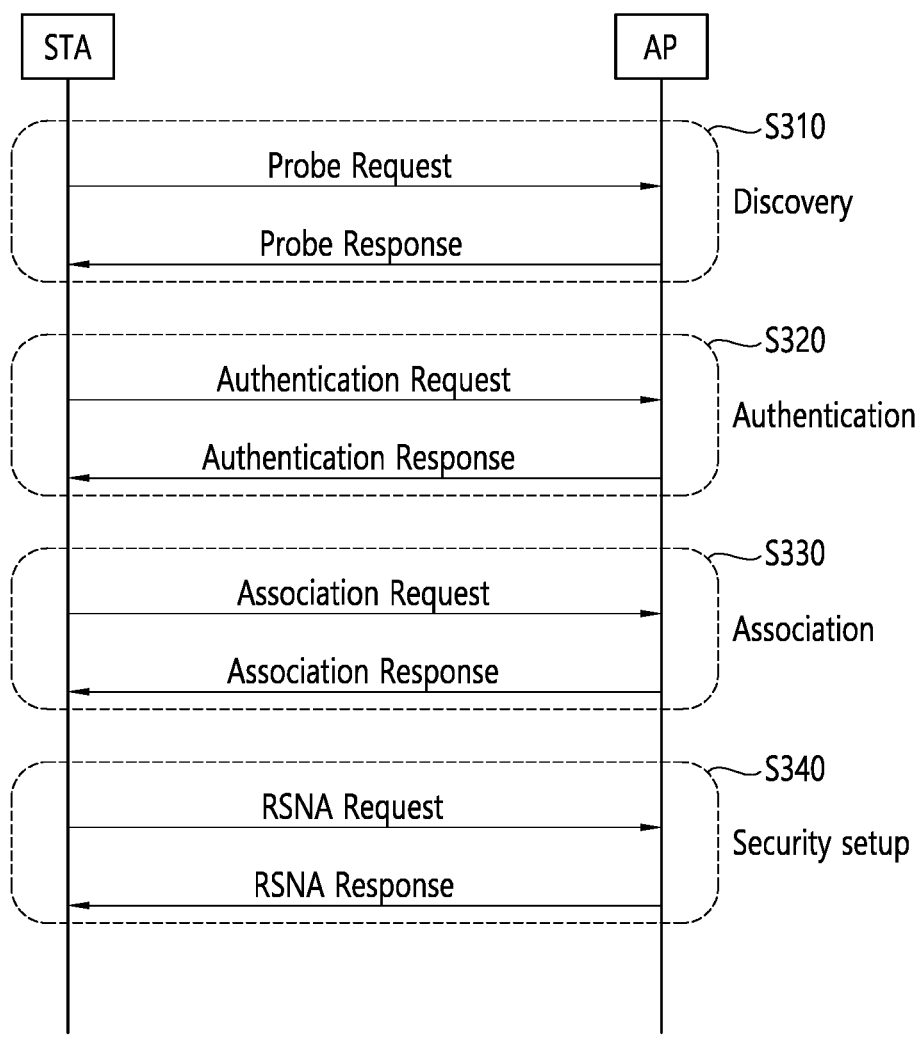
FIG. 3 illustrates a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
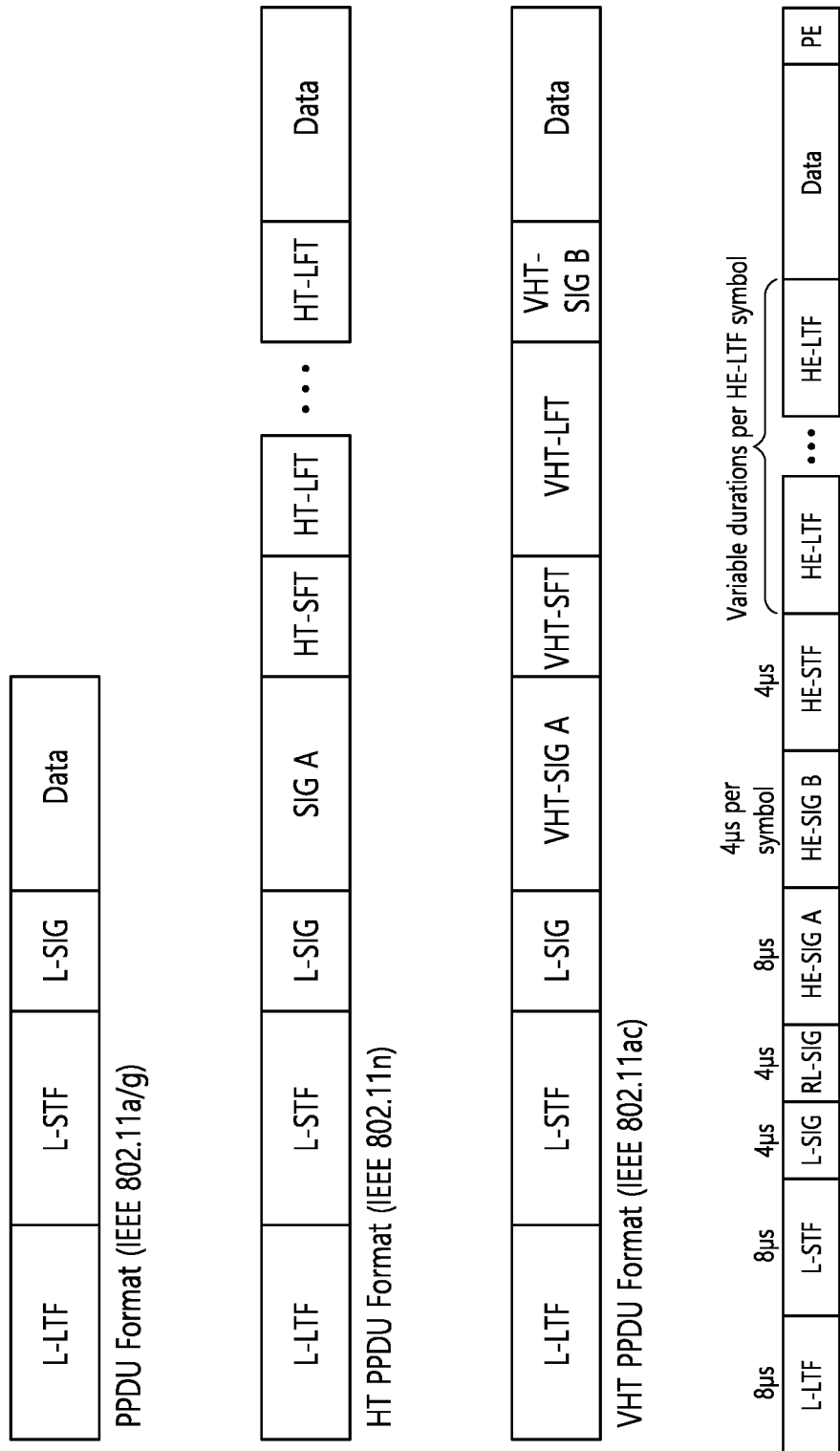
FIG. 4 illustrates an example of a PPDU used in an IEEE standard.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 µs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
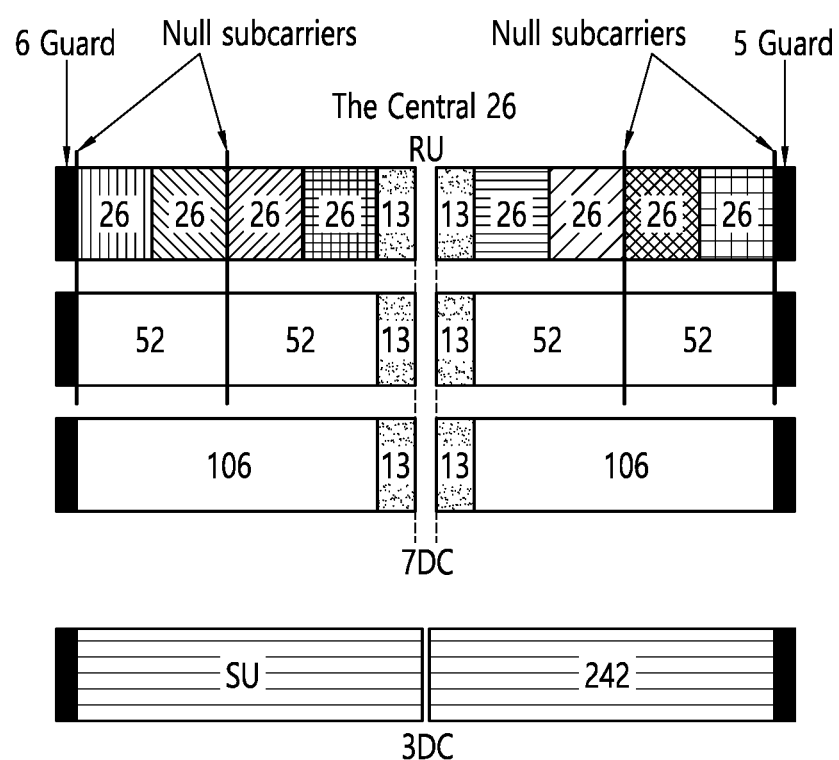
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
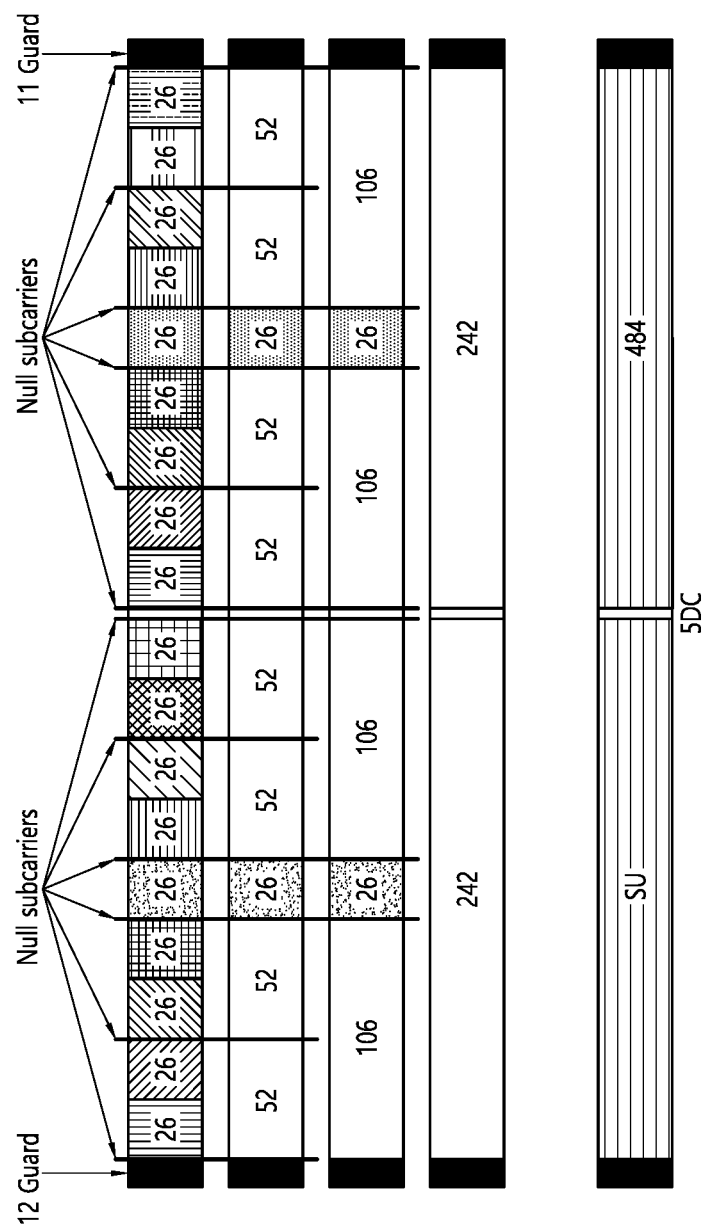
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
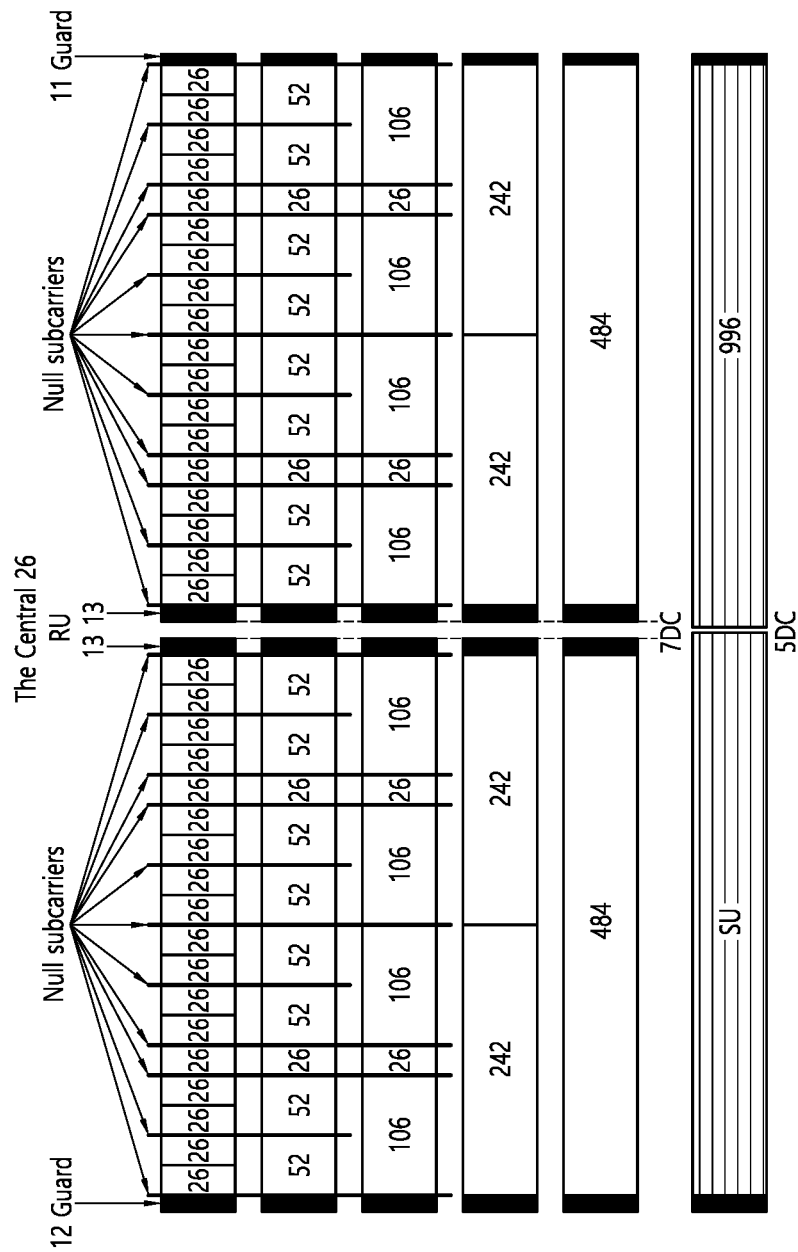
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
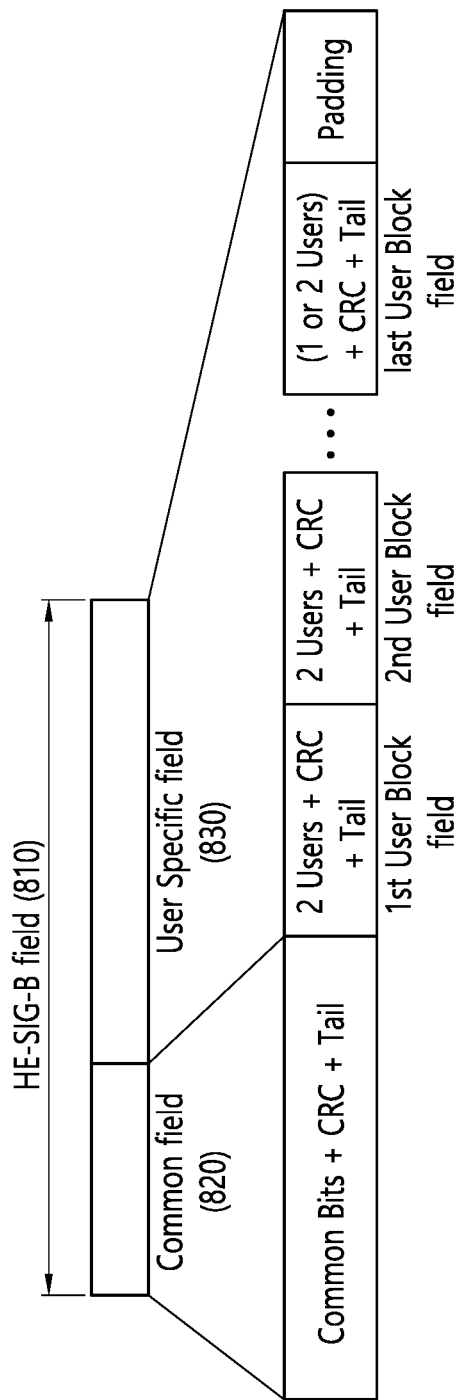
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | 106 | | | | 26 | 26 | 26 | 26 | 26 | 8 |
| 01001$y_2y_1y_0$ | 106 | | | | 26 | 26 | 26 | 52 | | 8 |

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
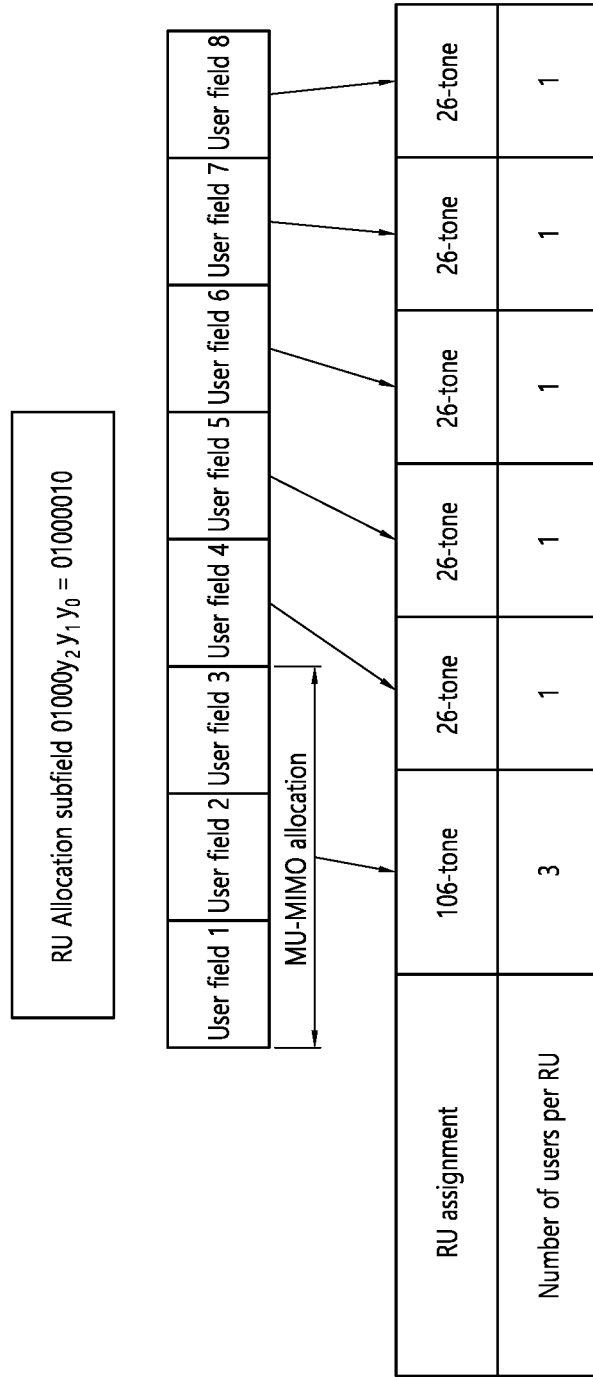
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-6 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS

[3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
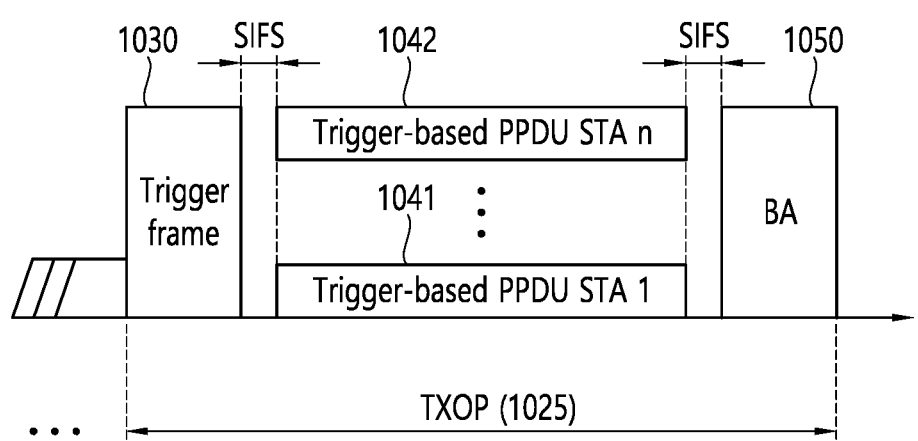
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
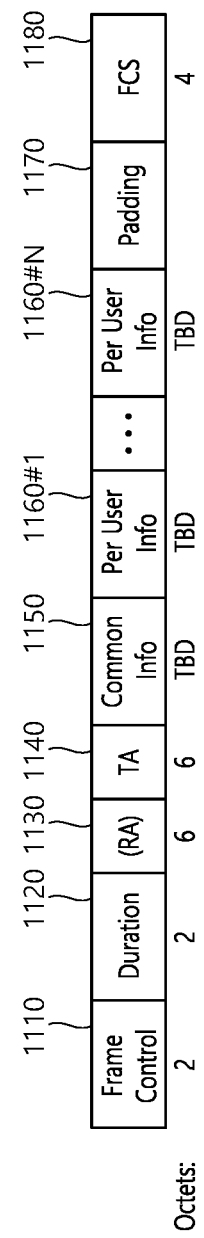
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
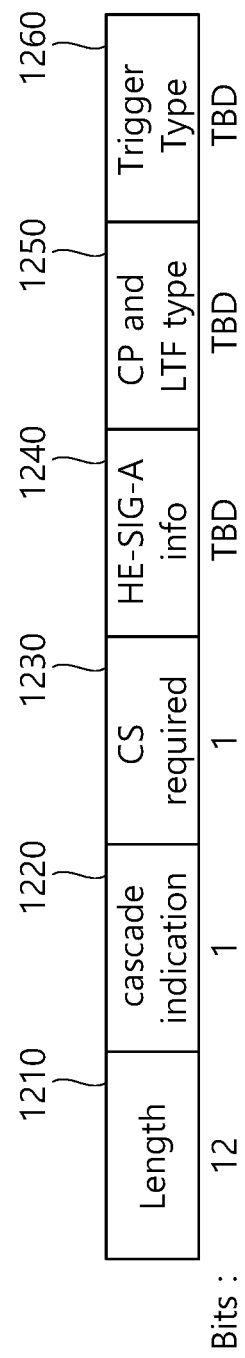
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
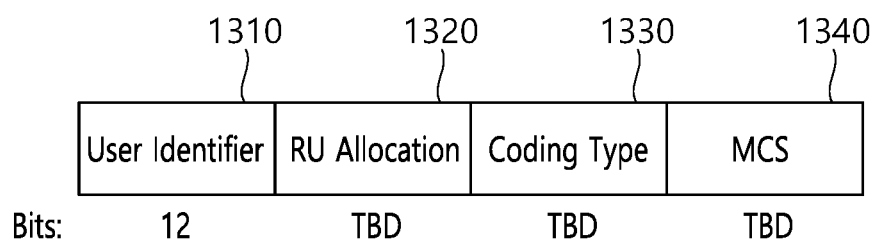
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
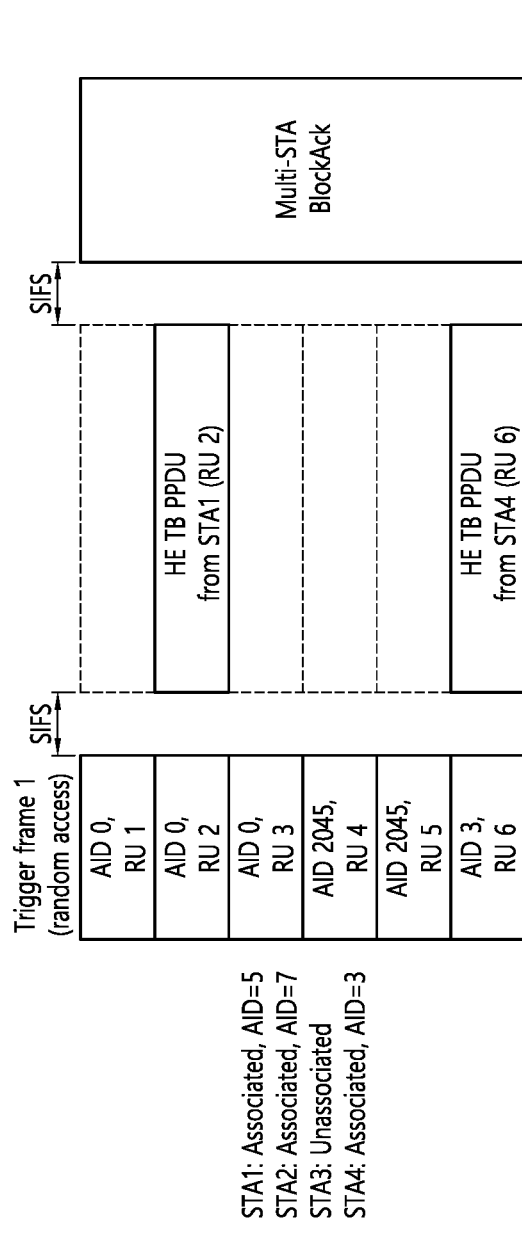
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
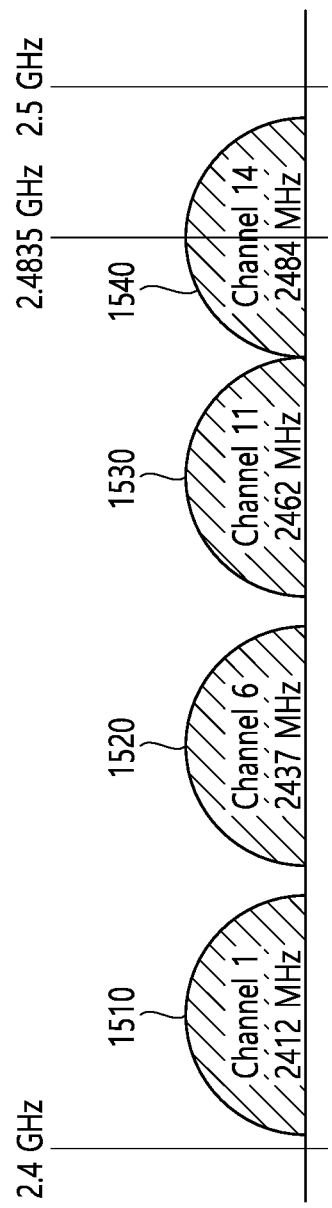
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
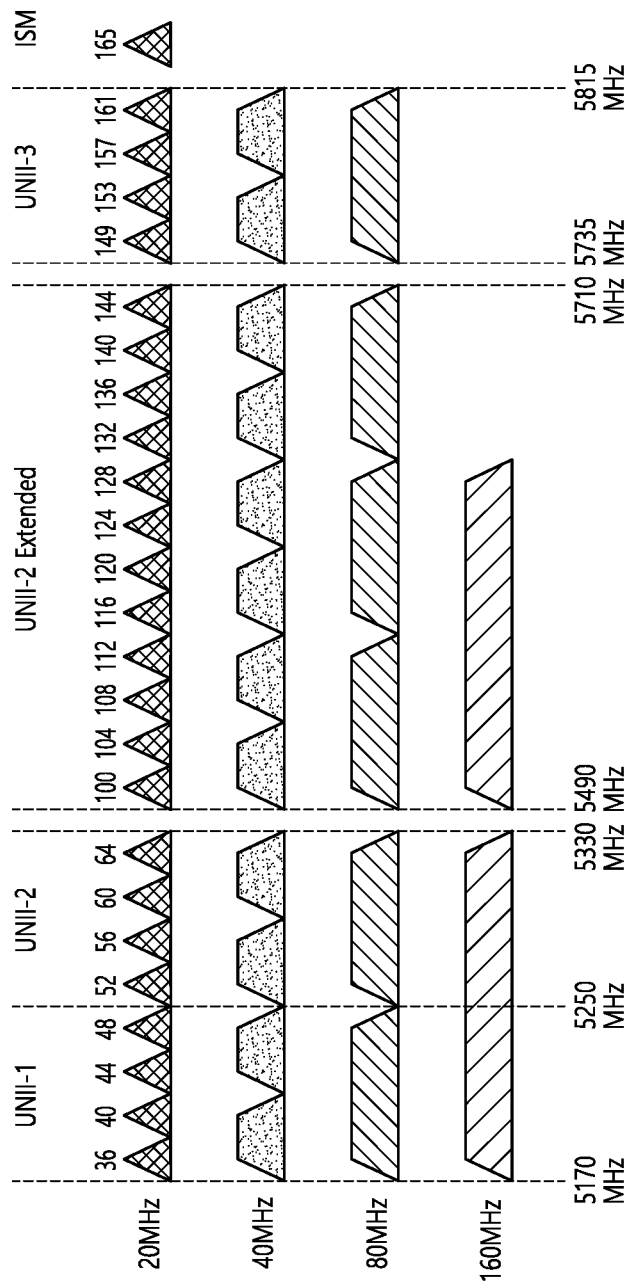
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
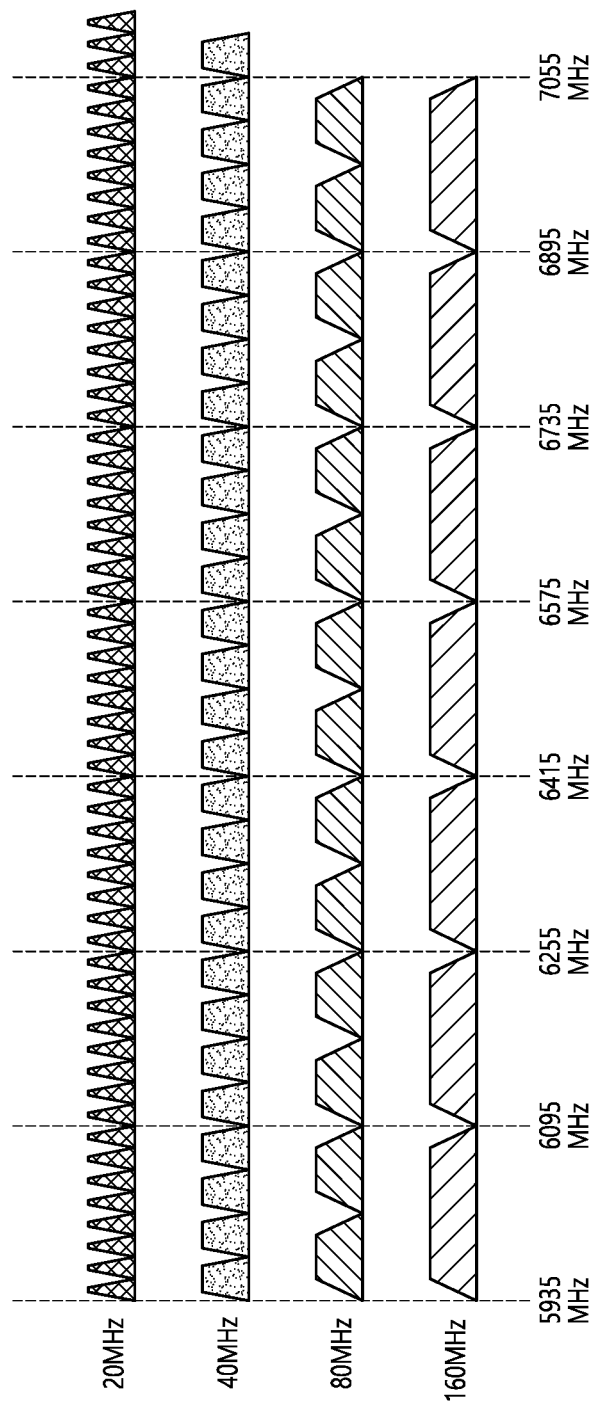
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
FIG. 18 illustrates an example of a PPDU used in the present specification.

FIG. 18 illustrates an example of a PPDU used in the present specification.

The PPDU of FIG. 18 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 18 may represent some or all of the PPDU types used in the EHT system. For example, the example of FIG. 18 may be used for both a single-user (SU) mode and a multi-user (MU) mode, or may be used only for the SU mode, or may be used only for the MU mode. For example, a trigger-based PPDU (TB) on the EHT system may be separately defined or configured based on the example of FIG. 18. The trigger frame described through at least one of FIGS. 10 to 14 and the UL-MU operation (e.g., the TB PPDU transmission operation) started by the trigger frame may be directly applied to the EHT system.

In FIG. 18, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 18, the L-LTF and the L-STF may be the same as those in the conventional fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {-28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 18. The U-SIG may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIG may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information related to whether a dual subcarrier modulation (DCM) scheme is applied to EHT-SIG; 4) a field including information related to the number of symbol used for EHT-SIG; 5) a field including information related to whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 18. The preamble puncturing implies that puncturing is applied to part (e.g., a secondary 20 MHz band) of the full band. For example, when an 80 MHz PPDU is transmitted, a STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHaz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 18 may include the technical feature of the HE-SIG-B shown in the examples of FIGS. 8 to 9 as it is. The EHT-SIG may be referred to by various names such as a second SIG field, a second SIG, a second type SIG, a control signal, a control signal field, and a second (type) control signal.

The EHT-SIG may include N-bit information (e.g., 1-bit information) regarding whether the EHT-PPDU supports the SU mode or the MU mode.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of consecutive tones, and a second modulation scheme may be applied to the remaining half of the consecutive tones. That is, a transmitting STA may use the first modulation scheme to modulate specific control information through a first symbol and allocate it to half of the consecutive tones, and may use the second modulation scheme to modulate the same control information by using a second symbol and allocate it to the remaining half of the consecutive tones. As described above, information (e.g., a 1-bit field) regarding whether the DCM scheme is applied to the EHT-SIG may be included in the U-SIG. An HE-STF of FIG. 18 may be used for improving automatic gain control estimation in a multiple input multiple output (MIMO) environment or an OFDMA environment. An HE-LTF of FIG. 18 may be used for estimating a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 µs, and a periodicity signal of 0.8 µs may be repeated 5 times to become a first type STF having a length of 4 µs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 µs, and a periodicity signal of 1.6 µs may be repeated 5 times to become a second type STF having a length of 8 µs. Hereinafter, an example of a sequence for configuring an EHT-STF (i.e., an EHT-STF sequence) is proposed. The following sequence may be modified in various ways.

The EHT-STF may be configured based on the following sequence M.

$$M=\{-1,-1,-1,1,1,1,-1,1,1,1,-1,1,1,-1,1\} \quad \text{<Equation 1>}$$

The EHT-STF for the 20 MHz PPDU may be configured based on the following equation. The following example may be a first type (i.e., 1×STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) 'a' to a tone index 'c'. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16=1250 kHz. In addition, * implies multiplication, and sqrt( ) implies a square root. In addition, j implies an imaginary number.

$$\text{EHT-STF}(-112{:}16{:}112)=\{M\}*(1+j)/\text{sqrt}(2)$$

$$\text{EHT-STF}(0)=0 \quad \text{<Equation 2>}$$

The EHT-STF for the 40 MHz PPDU may be configured based on the following equation. The following example may be the first type (i.e., 1×STF) sequence.

$$\text{EHT-STF}(-240{:}16{:}240)=\{M,0,-M\}*(1+j)/\text{sqrt}(2) \quad \text{<Equation 3>}$$

The EHT-STF for the 80 MHz PPDU may be configured based on the following equation. The following example may be the first type (i.e., 1×STF) sequence.

$$\text{EHT-STF}(-496{:}16{:}496)=\{M,1,-M,0,-M,1,-M\}*(1+j)/\text{sqrt}(2) \quad \text{<Equation 4>}$$

The EHT-STF for the 160 MHz PPDU may be configured based on the following equation. The following example may be the first type (i.e., 1×STF) sequence.

$$\text{EHT-STF}(-1008{:}16{:}1008)=\{M,1,-M,0,-M,1,-M,0,-M,-1,M,0,-M,1,-M\}*(1+j)/\text{sqrt}(2) \quad \text{<Equation 5>}$$

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

$$\text{EHT-STF}(-496{:}16{:}496)=\{-M,-1,M,0,-M,1,-M\}*(1+j)/\text{sqrt}(2) \quad \text{<Equation 6>}$$

Equation 7 to Equation 11 below relate to an example of a second type (i.e., 2×STF) sequence.

$$\text{EHT-STF}(-120{:}8{:}120)=\{M,0,-M\}*(1+j)/\text{sqrt}(2) \quad \text{<Equation 7>}$$

The EHT-STF for the 40 MHz PPDU may be configured based on the following equation.

$$\text{EHT-STF}(-248{:}8{:}248)=\{M,-1,-M,0,M,-1,M\}*(1+j)/\text{sqrt}(2)$$

$$\text{EHT-STF}(-248)=0$$

$$\text{EHT-STF}(248)=0 \quad \text{<Equation 8>}$$

The EHT-STF for the 80 MHz PPDU may be configured based on the following equation.

EHT-STF(−504:8:504)={$M$,−1,$M$,−1,−$M$,−1,$M$,0,−$M$,1,$M$,1,−$M$,1,−$M$}*(1+$j$)/sqrt(2)  <Equation 9>

The EHT-STF for the 160 MHz PPDU may be configured based on the following equation.

EHT-STF(−1016:16:1016)={$M$,−1,$M$,−1,−$M$,−1,$M$,0,−$M$,1,$M$,1,−$M$,1,−$M$,0,−$M$,1,−$M$,1,$M$,1,−$M$,0,−$M$,1,$M$,1,−$M$,1,−$M$}*(1+$j$)/sqrt(2)

EHT-STF(−8)=0,EHT-STF(8)=0,

EHT-STF(−1016)=0,EHT-STF(1016)=0  <Equation 10>

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

EHT-STF(−504:8:504)={−$M$,1,−$M$,1,$M$,1,−$M$,0,−$M$,1,$M$,1,−$M$,1,−$M$}*(1+$j$)/sqrt(2)

EHT-STF(−504)=0,

EHT-STF(504)=0  <Equation 11>

The EHT-LTF may have first, second, and third types (i.e., 1×, 2×, 4×LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 μs. In addition, a GI (e.g., 0.8/1/6/3.2 μs) having various lengths may be applied to the first/second/third type LTF.

Information related to a type of STF and/or LTF (information related to a GI applied to LTF is also included) may be included in a SIG-A field and/or SIG-B field or the like of FIG. 18.

A PPDU (e.g., EHT-PPDU) of FIG. 18 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frames, the management frame, and the data frame.

Figure 19:
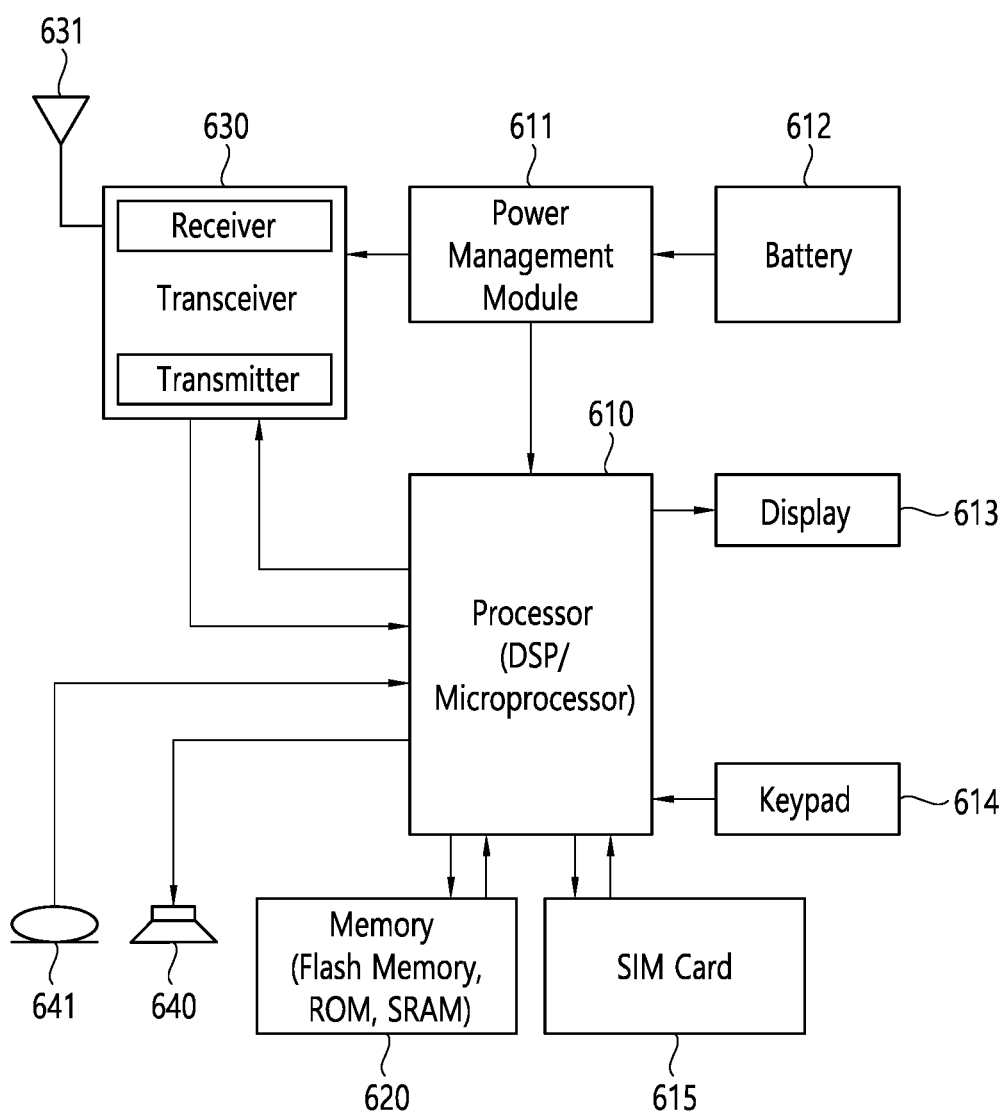
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Figure 20:
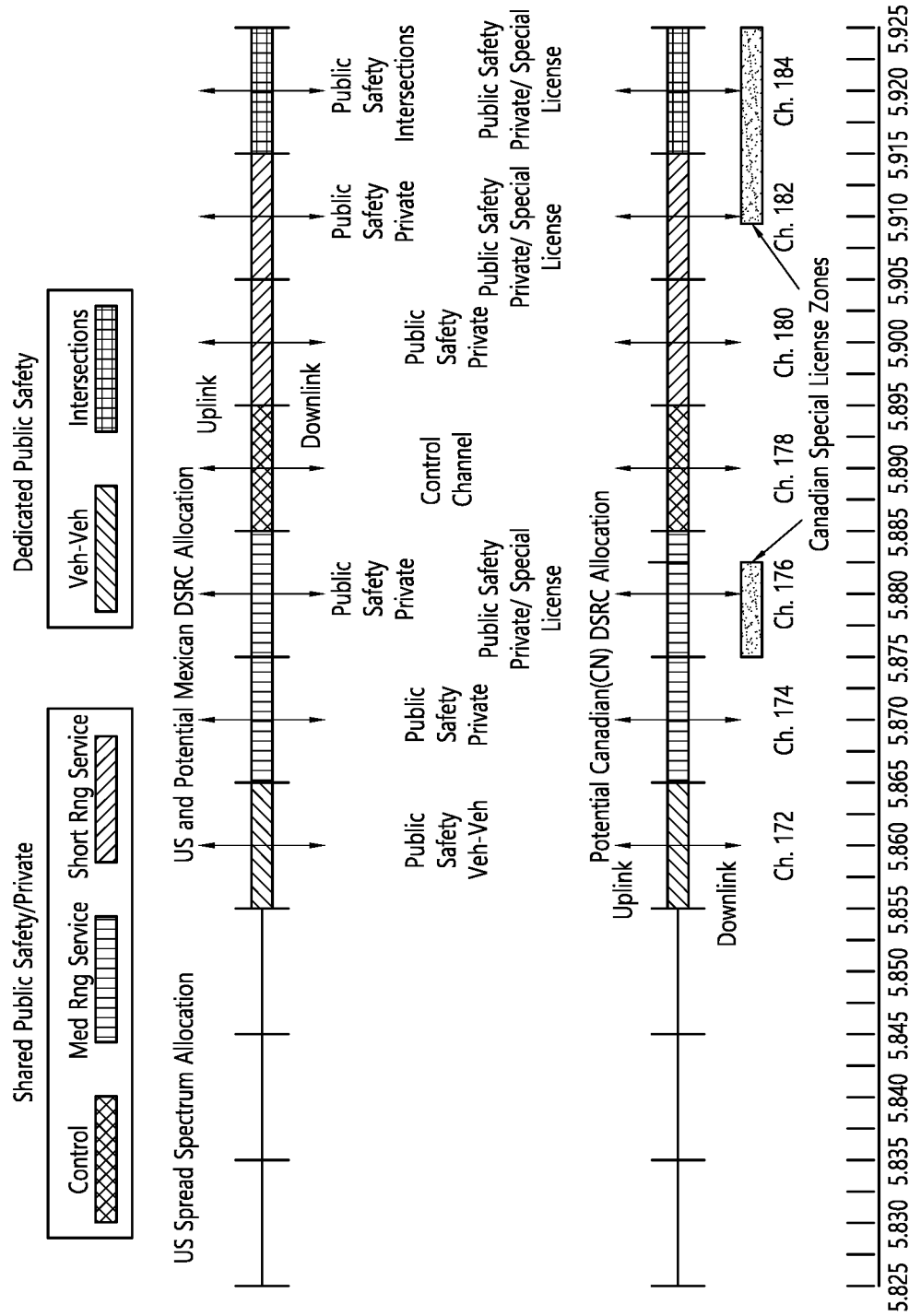
FIG. 20 shows a band plan of 5.9 GHz DSRC.

FIG. 20 shows a band plan of 5.9 GHz DSRC.

5.9 GHz DSRC is a short to medium range communications service that supports both public safety and private operations in roadside-to-vehicle and vehicle-to-vehicle communication environments. DSRC is devised as a complement to cellular communications by providing very high data transfer rates in situations where minimizing latency in the communication link and isolating relatively small communication zones are important. Additionally, PHY and MAC protocols are based on the revision of IEEE 802.11p for wireless access in a vehicular environment (WAVE).

<IEEE 802.11p>

802.11p uses a PHY of 802.11a by performing 2× downclocking on the PHY. That is, 802.11p transmits a signal by using a 10 MHz bandwidth and not a 20 MHz bandwidth. The numerology comparing 802.11a to 802.11p is as follows.

TABLE 5

|  | IEEE 802.11a | IEEE 802.11p |
| --- | --- | --- |
| Symbol duration | 4 us | 8 us |
| Guard period | 0.8 us | 1.6 us |
| Subcarrier spacing | 312.5 KHz | 156.25 KHz |
| OFDM subcarrier | 52 | 52 |
| Number of pilot | 4 | 4 |
| Default BW | 20 MHz | 10 MHz |
| Data rate (Mbps) | 6, 9, 12, 18, 24, 36, 48, 54 Mbps | 3, 4, 5, 6, 9, 12, 18, 24, 27 Mbps |
| Frequency band | 5 GHz ISM | 5.9 GHz. dedicated |

Channels of a DSRC band include a control channel and a service channel, and each channel is capable of performing data transmission at 3, 4.5, 6, 9, 12, 18, 24, and 27 Mbps. If an option channel (or optional channel) of 20 MHz exists, transmission at 6, 9, 12, 18, 24, 36, 48, and 54 Mbps may be performed. 6, 9, and 12 Mbps should be supported in all services and channels. And, in case of a control channel, although a preamble is 3 Mbps, the message itself is 6 Mbps. In case channels 174 and 176 and channels 180 and 182 are authorized by a frequency regulation organization, the channel sets may be channels 175 and 181 of 20 MHz, respectively. The remaining channel should be reserved for future usage. A short message or notification data, public safety alarm data, and so on, are broadcasted to all On Board Units (OBUs) through the control channel. The control channel and the service channel have been isolated in order to maximize efficiency and quality of service and to reduce interference between services.

Channel number 178 is a control channel, which automatically performs search and receives notification or data transmission, warning messages, and so on, from a Road Side Unit (RSU). All data of the control channel should be transmitted within 200 ms and is repeated at a pre-defined cycle. In a control channel, public safety warnings have the highest priority over any other private messages. Private messages that are larger than 20 Oms are transmitted through a service channel.

Private messages or long public safety messages, and so on, are transmitted through a service channel. In order to prevent collision (or conflict), a scheme for detecting channel status (i.e., Carrier Sense Multiple Access (CSMA)) is used prior to the transmission.

Hereinafter, EDCA parameters in an Outside Context of BSS (OCB) mode will be defined. An OCB mode denotes a state where direct communication between nodes can be performed without any procedure of association with an AP. The following shows a basic EDCA parameter set for STA operations, in case dot11OCBActivated is true.

TABLE 6

| AC | CWmin | CWmax | AIFSN | TXOP limit |
| --- | --- | --- | --- | --- |
| AC_BK | aCWmin | aCWmax | 9 | 0 |
| AC_BE | aCWmin | aCWmax | 6 | 0 |
| AC_VI | (aCWmin + 1)/2 − 1 | aCWmin | 3 | 0 |
| AC_VO | (aCWmin + 1)/4 − 1 | (aCWmin + 1)/2 − 1 | 2 | 0 |

Characteristics of the OCB mode are as follows.

1. In a MAC header, To/From DS fields may be set to '0'.
2. Fields related to Address Individual or group destination MAC address may be used.

A BSSID field may be the same as a wildcard BSSID. (BSSID field=wildcard BSSID)

In a Data/Management frame, Address 1 may be an RA, Address 2 may be a TA, and Address 3 may be a wildcard BSSID.

3. An authentication process, an association process, or data confidentiality services of the IEEE 802.11 standard may not be used (or utilized).
4. A TXOP limit may be set to '0'.
5. Only a TC (TID) may be used.
6. STAs may not be required to synchronize to a common clock or use such mechanisms.

STAs may maintain a timing synchronization function (TSF) timer for purposes other than synchronization 7. The STA may send Action frames, and, if the STA maintains a TSF Timer, the STA may transmit Timing Advertisement frames.
8. The STA may send control frames excluding subtype PS-Poll, CF-End, and CF-End +CFAck.
9. The STA may send data frames of subtype Data, Null, QoS Data, and QoS Null.
10. An STA having dot11OCBActivated that is equal to true should not join (or participate in) or start a BSS.

Format of 11p PPDU

Figure 21:
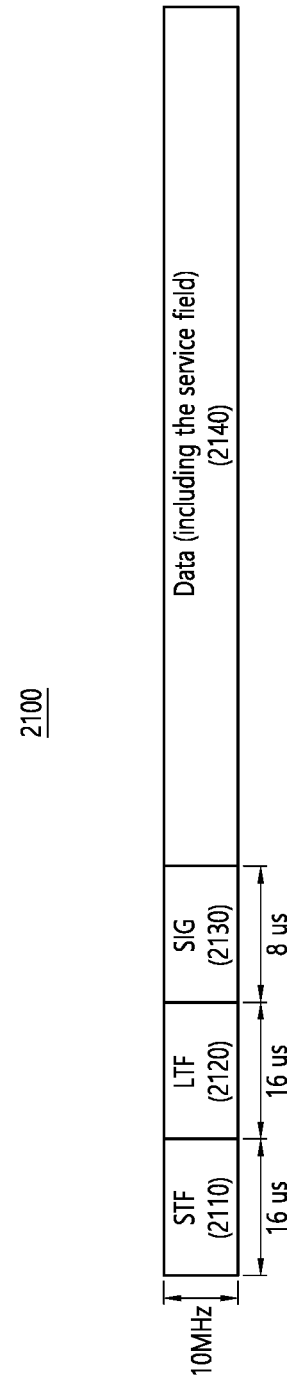
FIG. 21 shows a format of an 11p PPDU.

FIG. 21 shows a format of an 11p PPDU.

Referring to FIG. 21, a frame of the 802.11p standard (hereinafter referred to as 11p PPDU 2100) may support vehicle-to-vehicle (V2V) communication in a 5.9 GHz band. The 11p PPDU 2100 may include an STF 2110 for synchronization (sync) and Automatic Gain Control AGC, an LTF 2120 for channel estimation, and/or a SIG (or SIG field) 2130 including information related to a Data field 2140. The Data field 2140 may be configured to include 16 bits configuring the service field.

The 11p PPDU 2100 may be configured by applying the same OFDM numerology as the IEEE 802.11a standard for a 10 MHz bandwidth. For example, the IEEE 802.11p standard may be applied by 2× down-clocking the OFDM numerology for a 20 MHz bandwidth according to the IEEE 802.11a standard. Therefore, a symbol of the 11p PPDU 2100 may be configured to be longer than a symbol of a frame (or PPDU) of the IEEE 802.11a standard. A symbol of the 11p PPDU 2100 may have a symbol duration of 8 μs. The 11p PPDU 2100 may have a length that is two times longer than a frame according to the 802.11a standard in the aspect of time.

Format of NGV PPDU

Hereinafter, a technical characteristic that can provide interoperability of multiple system will be proposed. For example, multiple systems may include a system (IEEE 802.11bd standard) that is proposed for supporting throughput enhancement, coverage extension, and/or high speed for Vehicle-to-Everything (V2X) in a 5.9 GHz band, and/or a DSRC system that is based on the existing (or conventional) IEEE 802.11p standard.

In order to achieve smooth V2X support in a 5.9 GHz band, a technology for NGV considering throughput enhancement and high-speed support in the DSRC is being developed. FIG. 22 to FIG. 25 show the format of a frame (hereinafter referred to as NGV PPDU) according to the IEEE 802.11bd standard.

An NGV PPDU that will hereinafter be described may include a preamble, a data field that is contiguous to the preamble, and a midamble that is contiguous to the data field. Additionally, the NGV PPDU may include an additional data field that is contiguous to the midamble. A number of symbols or a periodicity (or period or cycle period) of a midamble within an NGV PPDU may be variously configured. For example, the preamble of the NGV PPDU may include an L-STF, an L-LTF, an L-SIG, an RL-SIG, an NGV-SIG, an RNGV-SIG, an NGV-STF, and/or an NGV-LTF. An NGV midamble may be configured to have the same format as the NGV-LTF. The above-mentioned L-SIG, RL-SIG, NGV-SIG, and/or RNGV-SIG may also be referred to as an L-SIG field, an RL-SIG field, an NGV-SIG field, and/or an RNGV-SIG field, respectively.

Figure 22:
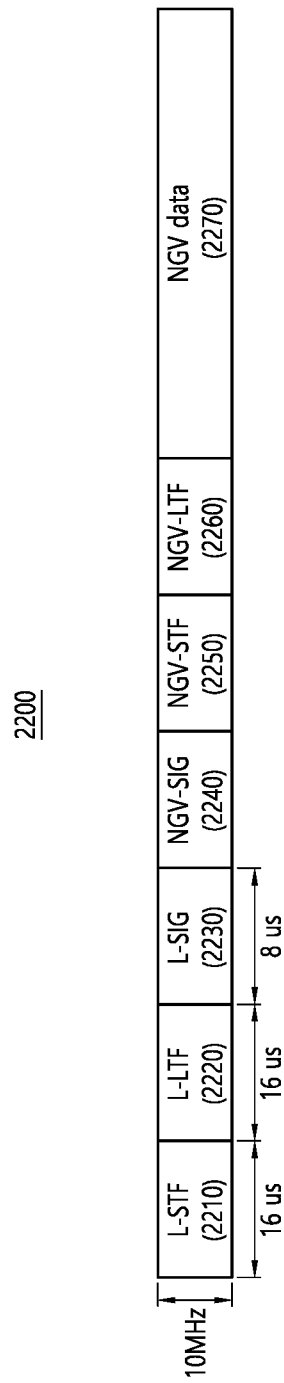
FIG. 22 shows a format of an NGV PPDU.

FIG. 22 shows a format of an NGV PPDU.

Referring to FIG. 22, the IEEE 802.11bd standard may be proposed for throughput enhancement and coverage extension in comparison with the IEEE 802.11p standard. That is, when a PPDU of the IEEE 802.11bd standard (e.g., NGV PPDU 2200) is used, the effects of throughput enhancement and coverage extension are greater than when using a PPDU of the IEEE 802.11p standard (e.g., 11p PPDU 2100 of FIG. 21).

The NGV PPDU 2200 may be configured to have a 10 MHz bandwidth. The NGV PPDU 2200 may include a preamble of an 11p PPDU (i.e., L-STF, L-LTF or L-SIG) for backward compatibility or interoperability with the IEEE 802.11p standard. For example, the NGV PPDU 2200 may include an L-STF 2210, an L-LTF 2220 or an L-SIG 2230. For example, the L-STF 2210, L-LTF 2220 or L-SIG 2230 may be located in a foremost position within the NGV PPDU 2200. In other words, when the L-STF 2210, L-LTF 2220 or L-SIG 2230 are transmitted these fields may be the first to be transmitted/received.

The NGV PPDU 2200 may include symbols constituting the NGV-SIG 2240, NGV-STF 2250 and NGV-LTF 2260 including control information for the NGV standard and NGV-data 2270. The NGV-SIG 2240, NGV-STF 2250, NGV-LTF 2260, and/or NGV-data 2270 may be positioned after L-SIG 2230.

Figure 23:
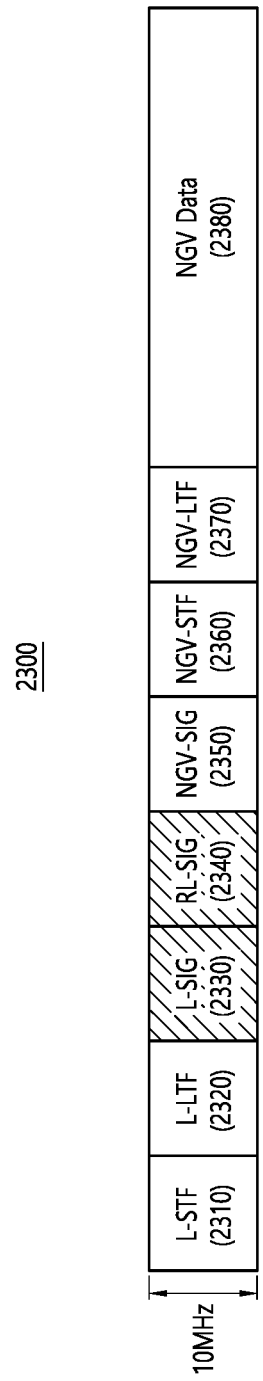
FIG. 23 shows another format of an NGV PPDU.

FIG. 23 shows another format of an NGV PPDU.

Referring to FIG. 23, the NGV PPDU 2300 includes an L-STF 2310, an L-LTF 2320, an L-SIG 2330, an RL-SIG 2340, an NGV-SIG 2350, an NGV-STF 2360, NGV-LTF 2370, and/or NGV data 2380. The RL-SIG 2340 may be contiguous to L-SIG 2330. The RL-SIG 2340 may include the same information field as the L-SIG 2330 and may be modulated (e.g., BPSK) in the same manner as the L-SIG 2330.

Unlike those shown in FIGS. 22 and 23, the NGV PPDU may be configured in various ways.

1) For example, when transmission of one spatial stream (or single stream) is performed, additional AGC may not be performed. In this case, unlike the NGV PPDUs 2200 and 2300 of FIGS. 22 and 23, the NGV-STF may be omitted. By doing so, a technical effect in which it is not necessary to configure the NGV-STF individually can be achieved. Accordingly, when broadcasting in an Outside Context of BSS (OCB) mode, a frame format in which NGV-STF is excluded may be used.

2) Like the NGV PPDU 2300 of FIG. 23, the L-SIG may be repeatedly transmitted after the L-SIG for robust transmission and/or range extension of the NGV standard. In other words, the RL-SIG may be contiguous to the L-SIG.

3) In order to use more available tones than 802.11a standard in NGV SIG, extra tone may be added to L-SIG. Also, when the L-SIG is repeated as the RL-SIG, the extra tone may be equally applied to the RL-SIG. In this case, the extra tone may be set in various ways. For example, the extra tone may be set to 4 tones. As an example, the tone index may be set to [−28, −27, 27, 28].

Figure 24:
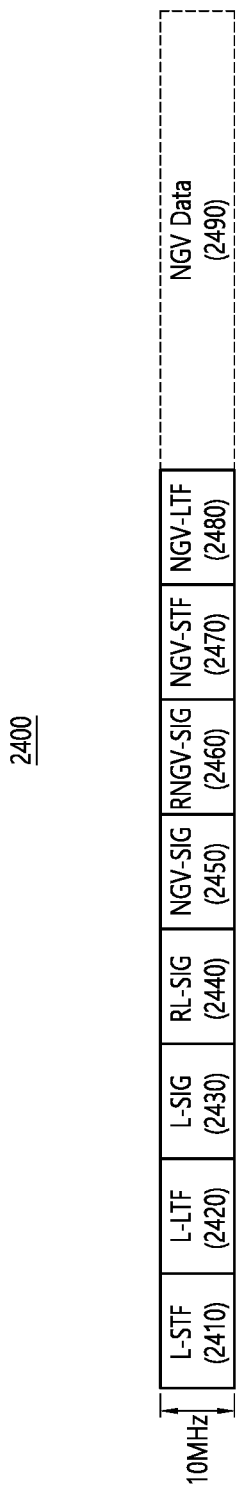
FIG. 24 shows a format of an NGV PPDU for performing 10 MHz transmission.

FIG. 24 shows a format of an NGV PPDU for performing 10 MHz transmission.

Referring to FIG. 24, for backward compatibility or interoperability with the IEEE 802.11p, an NGV PPDU 2400 may include fields (i.e., L-STF, L-LTF and/or L-SIG) of a frame according to the IEEE 802.11p standard (hereinafter referred to as an 11p PPDU). For example, the NGV PPDU 2400 may include an L-STF 2410, an L-LTF 2420 or an L-SIG 2430. Additionally, the NGV PPDU may include an RL-SIG 2440, an NGV-SIG 2450, an RNGV-SIG 2460, an NGV-STF 2470, an NGV-LTF 2480, and/or an NGV Data 2490.

The RL-SIG 2440 may be contiguous to the L-SIG 2430. The RL-SIG 2440 may be a field in which the L-SIG 2430 is repeated. In other words, the RL-SIG 2440 may include the same information field as the L-SIG 2430 and may be modulated by using the same method as the L-SIG 2430 (e.g., BPSK).

The NGV-SIG 2450 may be related to transmission information. For example, the NGV-SIG 2450 may include the transmission information. For example, the NGV-SIG 2450 may be configured to be equal to 24 bits. For example, the NGV-SIG 2450 may include information related to a Physical layer (PHY) Version, information related to a bandwidth, information related to an MCS, information related to a number of spatial streams, information related to a midamble periodicity, information related to an LTF format, information related to an LDPC Extra OFDM Symbol, information related to a CRC, and/or information related to a tail bit. BCC encoding based on a 1/2 coding rate may be applied to the NGV-SIG 2450.

The RNGV-SIG 2460 may be contiguous to the NGV-SIG 2450. The RNGV-SIG 2460 may be a field in which the NGV-SIG 2450 is repeated. In other words, the RNGV-SIG 2460 may include the same information field as the NGV-SIG 2450 and may be modulated by using the same method as the NGV-SIG 2450 (e.g., BPSK).

The NGV-STF 2470 may be configured by 2× down-clocking a 20 MHz VHT-STF that is configured according to the IEEE 802.11ac standard. The NGV-LTF 2480 may be configured by 2× down-clocking a 20 MHz VHT-LTF that is configured according to the IEEE 802.11ac standard.

The NGV-LTF 2480 may be configured based on at least one LTF format. For example, the NGV-LTF 2480 may be configured based on at least one of an NGV-LTF-1× format, an NGV-LTF-2× format, or a repeated NGV-LTF-2× format. Information related to the LTF format that is used in the NGV-LTF 2480 may be included in the NGV-SIG 2450.

For example, the NGV-LTF-2× format may be set as the default format. As another example, the NGV-LTF-1× format may be used for high-efficiency transmission of one spatial stream. As yet another example, the repeated NGV-LTF-2× format may be used for extended range transmissions. The repeated NGV-LTF-2× format may be configured by repeating the NGV-LTF-2× format from which 1.6 μs of one pre-appended cyclic prefix (CP) and guard interval (GI) are excluded. The repeated NGV-LTF-2× format may be used when dual carrier modulation (DCM) and BPSK modulation are applied to the NGV data 2490. For example, when the DCM and BPSK modulation are applied to the NGV data 2490, regardless of the information related to the LTF format included in the NGV-SIG 2450, the repeated NGV-LTF-2× format may be used in/applied to the NGV-LTF 2480.

For example, in the 10 MHz transmission, a sequence of the NGV-LTF-1× format may be configured as shown below in Equation 12

NGV-LTF-1×sequence=[1,0,1,0,−1,0,1,0,−1,0,−1,0,1,
0,1,0,1,0,−1,0,1,0,1,0,1,0,1,0,0,0,−1,0,1,0,−1,0,
−1,0,−1,0,−1,0,−1,0,1,0,−1,0,−1,0,−1,0,1,0,1,0,−
1]  <Equation 12>

For example, in the 10 MHz transmission, a sequence of the NGV-LTF-2× format may be configured as shown below in Equation 13

NGV-LTF-2×sequence=[1,1,LTF_left,0,LTF_right,
−1,−1]  <Equation 13>

Referring to Equation 13 LTF_left and LTF_right may be configured as shown below in Equation 14

LTF_left=[1,1,−1,−1,1,1,−1,1,−1,1,−1,1,1,1,1,1,−1,−1,1,
1,−1,1,−1,1,1,1,1]

LTF_right=[1,−1,−1,1,1,−1,1,−1,1,−1,1,−1,−1,−1,−1,1,1,
1,−1,−1,1,−1,1,1,−1,1,1,1,1]  <Equation 14>

The NGV data 2490 may include a service field, PHY pad bits, and/or a PSDU.

Although it is not shown in the drawing, the NGV PPDU 2400 may include a midamble that is contiguous to the NGV data 2490. Additionally, the NGV PPDU 2400 may include an additional data field that is contiguous to the midamble.

The midamble may be used for performing additional channel estimation. That is, the midamble has an effect of reducing the effect of Doppler shift.

The midamble may be inserted/configured in the NGV PPDU 2400 according to a designated periodicity. Information related to the designated periodicity may be included in the NGV-SIG 2450. For example, the NGV-SIG 2450 may include information related to the midamble periodicity. The midamble periodicity may be set to one of 4, 8 or 16. For example, when the midamble periodicity is set to 4, the NGV PPDU 2400 may include midamble(s) being inserted every 4 data symbols.

The midamble may be configured to have the same format as the NGV-LTF 2480. For example, the midamble may be configured of at least one of an NGV-LTF-1× format, an NGV-LTF-2× format, or a repeated NGV-LTF-2× format. Information related to the LTF format that is used in the midamble may be included in the NGV-SIG 2450.

Figure 25:
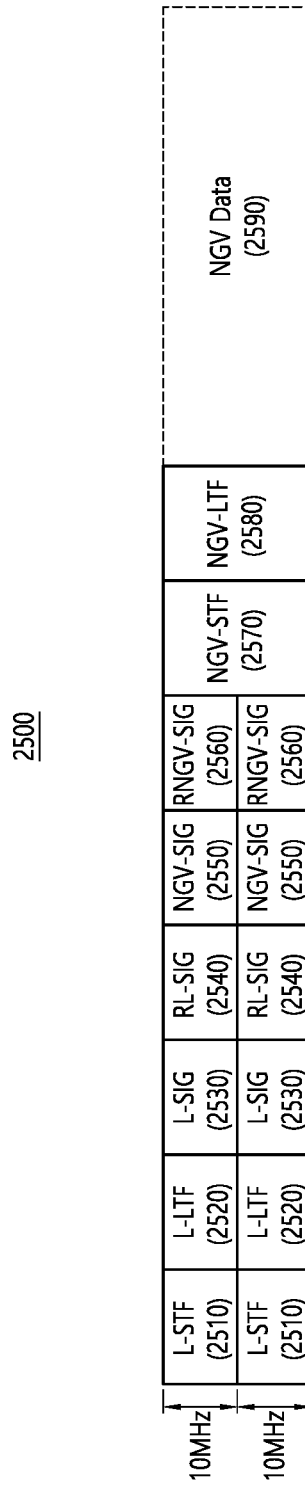
FIG. 25 shows a format of an NGV PPDU for performing 20 MHz transmission.

FIG. 25 shows a format of an NGV PPDU for performing 20 MHz transmission.

Referring to FIG. 25, an NGV PPDU 2500 may be configured of 20 MHz. The NGV PPDU 2500 may include an L-STF 2510, an L-LTF 2520, an L-SIG 2530, an RL-SIG 2540, an NGV-SIG 2550, an RNGV-SIG 2560, an NGV-STF 2570, an NGV-LTF 2580, and/or an NGV Data 2590.

The L-STF 2510, L-LTF 2520 or L-SIG 2530 may be configured by being duplicated in 10 MHz units. The L-STF 2510, L-LTF 2520 or L-SIG 2530 may be related to the L-STF 2410, L-LTF 2420 or L-SIG 2430 of FIG. 24.

According to an embodiment, the RL-SIG 2540, NGV-SIG 2550 or RNGV-SIG 2560 may also be configured by being duplicated in 10 MHz units. The RL-SIG 2540, NGV-SIG 2550 or RNGV-SIG 2560 may be related to the RL-SIG 2440, NGV-SIG 2450 or RNGV-SIG 2460 of FIG. 24, respectively.

The NGV-STF 2570 may be configured by 2× down-clocking a 40 MHz VHT-STF that is configured according to the IEEE 802.11ac standard. The NGV-LTF 2580 may be configured by 2× down-clocking a 40 MHz VHT-LTF that is configured according to the IEEE 802.11ac standard.

The NGV-LTF 2580 may be configured based on at least one LTF format. For example, the NGV-LTF 2580 may be configured based on at least one of an NGV-LTF-1× format, an NGV-LTF-2× format, or a repeated NGV-LTF-2× format.

For example, in the 20 MHz transmission, a sequence of the NGV-LTF-1× format may be configured as shown below in Equation 15.

NGV-LTF-1×sequence=[1,0,−1,0,1,0,−1,0,−1,0,1,0,1,
0,1,0,−1,0,1,0,1,0,1,0,1,0,1,0,−1,0,1,0,−1,0,−1,
0,−1,0,−1,0,1,0,1,0,−1,0,−1,0,1,0,1,0,1,0,−1,0,
1,0,0,0,−1,0,1,0,1,0,−1,0,1,0,−1,0,−1,0,1,0,1,0,1,
0,−1,0,1,0,1,0,1,0,1,0,1,0,−1,0,1,0,−1,0,−1,0,−1,
0,−1,0,−1,0,1,0,−1,0,−1,0,1,0,1,0,1]  <Equation 12>

For example, in the 20 MHz transmission, a sequence of the NGV-LTF-2× format may be configured as shown below in Equation 16.

NGV-LTF-2×sequence=[LTF_left,1,LTF_right,−1,
−1,−1,1,0,0,0,−1,1,1,−1,LTF_left,1,LTF_right]  <Equation 16>

Referring to Equation 16 LTF_left and LTF_right may be configured as presented above in Equation 14.

The NGV data 2590 may include a service field, PHY pad bits, and/or a PSDU. The NGV data 2590 may be related to the NGV data 2490 of FIG. 24.

Although it is not shown in the drawing, similarly to the NGV PPDU 2400 of FIG. 24, the NGV PPDU 2500 may include a midamble that is contiguous to the NGV data 2590. Additionally, the NGV PPDU 2500 may include an additional data field that is contiguous to the midamble.

An example of this specification is related to an NGV PPDU (or 11bd PPDU). The NGV PPDU may be used in various wireless communication systems, and, for example, the NGV PPDU may be used in an IEEE 802.11bd wireless LAN communication system.

The NGV PPDU may be referred to by using various terms. For example, the NGV PPDU may also be referred to as an NGV frame, an 11bd frame, an 11bd PPDU, and so on. Additionally, as another example, the NGV PPDU may also be referred to by using other various terms, such as a first type PPDU, a transmission PPDU, a reception PPDU, a WLAN PPDU, and so on. Hereinafter, for simplicity in the description, a frame of the IEEE 802.11bd standard may also be referred to as an NGV PPDU. Additionally, a PPDU according to the IEEE 802.11p standard may also be referred to as an 11p PPDU.

Similarly, an STA supporting the IEEE 802.11bd standard may also be referred to by using other various terms. For example, an STA supporting the IEEE 802.11bd standard may also be referred to as an 11bd STA, an NGV STA, a transmitting STA or a receiving STA. Hereinafter, for simplicity in the description, the STA supporting the IEEE 802.11bd standard may be referred to as a transmitting/receiving STA. Additionally, an STA supporting the IEEE 802.11p standard may be referred to as an 11p STA. Furthermore, the 5.9 GHz band may also be variously referred to as an NGV band, a reception band, a transmission band, and so on.

Midamble Configuration of NGV PPDU

When a transmitting STA transmits an NGV PPDU (e.g., NGV PPDU 2400, 2500), in order to reduce the effect of Doppler shift, which is caused by high speed, the NGV STA may periodically transmit a midamble between NGV-data fields. The configuration of a midamble, which is included in an NGV PPDU, may be described in detail with reference to FIG. 26.

Figure 26:
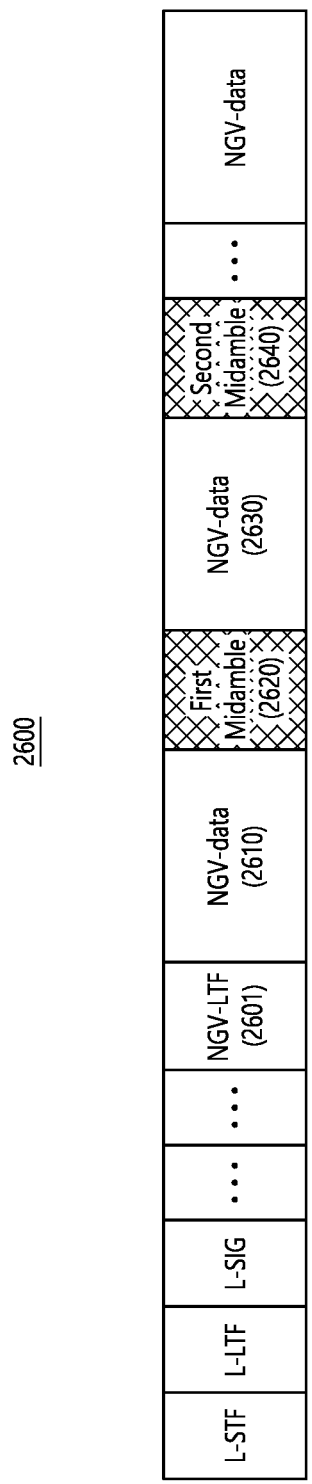
FIG. 26 shows a midamble configuration in an NGV PPDU.

FIG. 26 shows a midamble configuration in an NGV PPDU.

Referring to FIG. 26, an NGV PPDU may include at least one midamble.

According to an embodiment, the NGV PPDU 2600 may include a first midamble 2620 that is continuous to the NGV-data 2610. The NGV PPDU 2600 may include NGV-data 2630 continuous to the first midamble 2620. The NGV PPDU 2600 may include a second midamble 2640 continuous to the NGV-data 2630.

According to an embodiment, the midambles 2620 and 2640 may be inserted/configured in the middle of the NGV-data part at a specified period (i.e., the transmission periodicity of the midamble). For example, the NGV PPDU 2600 may include midambles 2620 and 2640 having the periodicity of M symbol following the NGV-LTF 2601. That is, the each of the NGV-data 2610 and the NGV-data 2630 may have M symbols.

Structure of Midamble

According to an embodiment, the midamble may be configured based on NGV-LTF (e.g., 1×-LTF). According to an embodiment, the midamble may be configured based on a compressed LTF (or a compressed LTF sequence). For example, the midamble may be configured based on 2×-compressed LTF (or 2×-LTF sequence) or 4×-compressed LTF (or 4×-LTF sequence). That is, the midamble and the NGV-LTF may be configured as one of 1×-LTF, 2×-LTF, and 4×-LTF. In other words, the format of the midamble and the NGV-LTF may be set to one of 1×-LTF, 2×-LTF, and 4×-LTF.

According to an embodiment, the LTF signal may be generated based on the LTF sequence, and the LTF signal may constitute the midamble. The LTF signal may be called variously. For example, the LTF signal may be referred to as an LTF or an LTF symbol. Hereinafter, for convenience of description, the LTF signal (e.g., NGV-LTF signal) may be described as LTF (e.g., NGV-LTF). As an example, the 1×-LTF signal may be described as 1×-LTF.

For example, the midamble and the NGV-LTF may be configured with the same LTF (or LTF sequence) for transmission. For example, the midamble may be configured based on 1×-LTF (or 1×-LTF sequence), and the NGV-LTF may be configured based on the same 1×-LTF (or 1×-LTF sequence) as the midamble.

As another example, the midamble may be configured based on a sequence different from that of the NGV-LTF. As an example, the NGV-LTF may be configured based on 1×-LTF (or 1×-LTF sequence), and the midamble may be configured based on 2×-LTF (or 2×-LTF sequence).

The above-described example is only one example and is not limited thereto. The NGV-LTF and the midamble may be variously configured based on a combination of 1×/2×/4× LTF.

The above-described 1×/2×/4×LTF may be configured as follows.

1) 1×-LTF (normal LTF)—The 1×-LTF may be configured such that an LTF sequence is carried on all available tones. For example, the 1×-LTF may be referred to as a second format related to an LTF sequence of a second interval. For example, the LTF sequence constituting the 1×-LTF may be set to non-zero in all available tones. For example, the available tones may denote tones excluding DC tone(s) and guard tone(s) from all tones within a bandwidth. The DC tone(s) and guard tone(s) may be set based on bandwidth.

For example, in a 10 MHz band, the DC tone(s) may consist of 1 tone. The left guard tone(s) may consist of 4 tones. The right guard tone(s) may consist of 3 tones. Therefore, the available tones in a 10 MHz band may consist of 56 tones. That is, the LTF sequence constituting the 1×-LTF of 10 MHz may have non-zero elements/values in 56 tones. In addition, the LTF sequence constituting the 1×-LTF of 10 MHz may be set to "0" (zero) in the DC tone(s) consisting of 1 tone. The LTF sequence constituting the 1×-LTF of 10 MHz may be related to the NGV-LTF-2× sequence of Equation 13.

As another example, in a 20 MHz band, the DC tone(s) may consist of 3 tones. The left guard tone(s) may consist of 6 tones. The right guard tone(s) may consist of 5 tones. Accordingly, the available tones in a 20 MHz band may consist of 114 tones. That is, the LTF sequence constituting the 1×-LTF of 20 MHz may be have non-zero elements/values in 114 tones. In addition, the LTF sequence constituting the 1×-LTF of 20 MHz may be set to "0" (zero) in the DC tone(s) consisting of 3 tones. The LTF sequence constituting the 1×-LTF of 20 MHz may be related to the NGV-LTF-2× sequence of Equation 16.

According to an embodiment, the 1×-LTF may be called variously. For example, the 1×-LTF may be referred to as 1×-compressed LTF. As another example, the 1×-LTF may be referred to as a 1×-LTF symbol.

2) 2×-compressed LTF—The 2×-compressed LTF may be configured such that an LTF sequence is carried in an interval of 2 tones within the available tones. A 2×-compressed LTF may be configured by using only one of the two repeated signals within one symbol. Since only one of the two repeated signals is used, the length of the 2×-compressed LTF may be set to ½ of the length of the 1×-compressed LTF. For example, the 2×-compressed LTF may be referred to as a first format related to an LTF sequence of a first interval. For example, the LTF sequence constituting the 2×-compressed LTF may be set to non-zero at an interval of 2 tones within the available tones. For example, the available tones may denote tones excluding the DC tone(s) and guard tone(s) from all tones within a bandwidth. The DC tone(s) and guard tone(s) may be set based on bandwidth.

For example, in a 10 MHz band, the DC tone(s) may consist of 1 tone. Also, the available tones may consist of 56 tones. That is, the LTF sequence constituting the 2×-compressed LTF of 10 MHz may be set to '0' (zero) in the DC tone(s) consisting of 1 tone. In addition, the LTF sequence constituting the 2×-compressed LTF of 10 MHz may have 'non-zero' elements/values at an interval of 2 tones in the available tones of 56 tones. The LTF sequence constituting the 2×-compressed LTF of 10 MHz may be related to the NGV-LTF-1× sequence of Equation 12.

As another example, in a 20 MHz band, the DC tone(s) may consist of 3 tones. Also, the available tones may consist of 114 tones. That is, the LTF sequence constituting the 2×-compressed LTF of 20 MHz may be set to '0' (zero) in the DC tone(s) consisting of 3 tones. In addition, the LTF sequence constituting the 2×-compressed LTF of 20 MHz may have 'non-zero' elements/values at an interval of 2 tones in the available tones of 114 tones. The LTF sequence constituting the 2×-compressed LTF of 20 MHz may be related to the NGV-LTF-1× sequence of Equation 15.

According to an embodiment, the 2×-compressed LTF may be called variously. For example, the 2×-compressed LTF may be referred to as a 2×-LTF. As another example, the 2×-compressed LTF may be referred to as a 2×-compressed LTF symbol.

3) 4×-compressed LTF—The 4×-compressed LTF can be configured such that the LTF sequence is carried in 4-tone intervals within the available tones. The 4×-compressed LTF may be configured by using only one of the four repeated signals within one symbol. The length of the 4×-compressed LTF may be set to ¼ of the length of the 1×-LTF. For example, the LTF sequence constituting the 4×-compressed LTF may have non-zero elements/values at intervals of 4 tones within the available tones. For example, the available tones may denote tones excluding the DC tone(s) and the guard tone(s) from all tones within a bandwidth. The DC tone(s) and guard tone(s) may be set based on bandwidth.

For example, in a 10 MHz band, the DC tone(s) may consist of 1 tone. Also, the available tones may consist of 56 tones. That is, the LTF sequence constituting the 4×-compressed LTF of 10 MHz may be set to '0' (zero) in the DC tone(s) consisting of 1 tone. In addition, the LTF sequence constituting the 4×-compressed LTF of 10 MHz may have 'non-zero' elements/values at intervals of 4 tones in the available tones of 56 tones.

As another example, in the 20 MHz bandwidth, the DC tone(s) may be set to 3 tones. Also, the available tones may be set to 114 tones. That is, the LTF sequence constituting the 4×-compressed LTF of 20 MHz may be set to '0' (zero) in the DC tone(s) of 3 tones. In addition, the LTF sequence constituting the 4×-compressed LTF of 20 MHz may be set to 'non-zero' at an interval of 4 tones in the available tones of 114 tones.

According to an embodiment, the 4×-compressed LTF may be called variously. For example, the 4×-compressed LTF may be referred to as a 4×-LTF. As another example, the 4×-compressed LTF may be referred to as a 4×-compressed LTF symbol.

4) repeated 2×-compressed LTF—The repeated 2×-compressed LTF may be configured based on the 2×-compressed LTF. While the 2×-compressed LTF is configured by using only one signal among two signals repeated within one symbol, the repeated 2×-compressed LTF can be configured by using both signals repeated within one symbol. have.

Therefore, the repeated 2×-compressed LTF may be set to the same length as the existing symbol (e.g., 1×-LTF). When repeated 2×-compressed LTF is used, since channel estimation is performed using two LTF sequences repeated within one symbol, there is an effect of improving the performance of channel estimation.

According to an embodiment, the repeated 2×-compressed LTF may be called variously. For example, a repeated 2×-compressed LTF may be called a repeated 2×-LTF. As another example, the repeated 2×-compressed LTF may be called a repeated 2×-compressed LTF symbol.

According to an embodiment, the NGV PPDU may be transmitted in a high-speed environment in which Doppler shift has a large influence. Accordingly, the transmitting STA transmitting the NGV PPDU may configure the midamble based on the reception environment (or the transmission environment). In other words, the transmitting STA may set the format or periodicity of the midamble based on the reception environment. When the midamble is transmitted based on the reception environment, there is an effect of increasing transmission efficiency (or reception performance).

For example, the transmitting STA may reduce the overhead of the midamble by setting the midamble periodicity (or the transmission periodicity) to be long in a channel situation where the reception signal to interference plus noise ratio (SINR) is high. Conversely, in a poor reception situation, the transmitting STA may transmit a signal by setting a short periodicity (or transmission periodicity) of the midamble for accurate channel estimation.

As another example, when a low MCS is used, data is robustly modulated and transmitted. Accordingly, the transmitting STA may transmit a signal by setting the midamble periodicity to be long. Conversely, when high MCS is used, the transmitting STA may transmit a signal by setting a short periodicity of the midamble for accurate channel estimation.

For another example, in a channel environment with a large Doppler influence, for accurate channel estimation, the transmitting STA may improve reception performance by using a midamble composed of repeated 2×-LTF.

Hereinafter, an embodiment for transmitting information related to the format of the midamble and/or the periodicity of the midamble may be described.

First Embodiment

The transmitting STA may use various midamble periodicity based on the channel condition and the transmitting MCS(s). Accordingly, the transmitting STA may transmit information related to the midamble periodicity through the NGV-SIG. In addition, the transmitting STA may transmit information related to a mode of the midamble through the NGV-SIG. The information related to the mode of the midamble may mean information related to a format of the midamble.

According to an embodiment, the information related to the mode of the midamble may be set as 1-bit information or 2-bit information.

For example, information related to the mode of the midamble may be set as 1-bit information.

For example, the 1-bit information may indicate 1×-LTF and 2×-LTF. When the 1-bit information is set to a first value (e.g., "0"), the 1-bit information may indicate 2×-LTF. When the 1-bit information is set to a second value (e.g., "1"), the 1-bit information may indicate 1×-LTF. Conversely, when the 1-bit information is set to the first value (e.g., "0"), the 1-bit information may indicate the 1×-LTF. When the 1-bit information is set to the second value (e.g., "1"), the 1-bit information may indicate the 2×-LTF.

As another example, information related to the mode of the midamble may indicate 1×-LTF and 4×-LTF.

For example, information related to the mode of the midamble may be set as 2-bit information. The mode (or format) of the midamble indicated by the 2-bit information may be set as shown in Table 7. In other words, the transmitting STA may transmit information related to the mode of the midamble based on the 2-bit information.

TABLE 7

| Bit | inform |
|---|---|
| 00 | 1× |
| 01 | 2× |
| 10 | 4× |
| 11 | Reserved |

Referring to Table 7, for example, when the 2-bit information is set to a first value (e.g., "00"), the 2-bit information may indicate 1×-LTF. In other words, when the 2-bit information is set to the first value, the midamble may be configured as a 1×-LTF sequence. For example, when the 2-bit information is set to a second value (e.g., "01"), the 2-bit information may indicate 2×-LTF. In other words, when the 2-bit information is set to the second value, the midamble may be configured as a 2×-LTF sequence. For example, when the 2-bit information is set to a third value (e.g., "10"), the 2-bit information may indicate 4×-LTF. In other words, when the 2-bit information is set to the third value, the midamble may be configured as a 4×-LTF sequence. For example, when the 2-bit information is set to a fourth value (e.g., "11"), the 2-bit information may be set as reserved.

The information indicated by the 2-bit information shown in Table 7 is exemplary, and may be set differently from Table 7.

According to an embodiment, the mode of the midamble may be classified into compressed and non-compressed. For example, the compressed mode may include the 2×-LTF or the 4×-LTF. The non-compressed mode may include the 1×-LTF.

For another example, the compressed mode may be used fixedly as one of the 2×-LTF and the 4×-LTF. In this case, information related to the mode of the midamble may be set as 1-bit information. For example, when information related to the midamble mode is set to a first value (e.g., "0"), the midamble mode may be set to the non-compressed mode. For example, when information related to the midamble mode is set to a second value (e.g., "1"), the mode of the midamble may be set to the compressed (or repeated 2× compressed) mode.

In the above example, the compressed midamble may be constructed using only one repeated time sequence formed in one symbol. The compressed midamble may be composed by using both of two repeated time sequences formed in one symbol.

In the embodiment of the present specification, the compressed midamble may be configured using only one sequence, or may be configured using both. Therefore, when the midamble is composed of repeated 2× compressed, the above-described information related to the mode of the midamble may mean that the midamble is composed by using all of the repeated signals.

Information related to the periodicity of the midamble may be set in various ways. Hereinafter, various embodiments in which information related to the periodicity of the midamble is set may be described.

According to an embodiment, two values may be set for the periodicity of the midamble. In this case, the periodicity of the two midambles may be set in various ways. For example, the periodicity of the midamble may be set to 4 or 8 symbols. As another example, the periodicity of the midamble may be set to 5 or 10 symbols.

The value of the above-described example may be a Midamble Periodicity (MP) for single stream transmission. In the case of 2-streams, a periodicity of a value different from the value of the above-described example may be used. For example, the periodicity of the midamble may be set to 3 or 5 symbols. As another example, the periodicity of the midamble may be set to 3 or 6 symbols. As another example, the periodicity of the midamble may be set to 4 or 5 symbols. As another example, the periodicity of the midamble may be set to 4 or 6 symbols.

According to an embodiment, as described above, two values are used for the periodicity of the midamble, and a value having different periodicities of the midamble according to the number of streams may be used. That is, based on the information (or field) on the number of spatial streams (Nss), the information (or field) on the periodicity of the midamble may indicate a different value. Signaling for this may be configured as shown in Table 8.

TABLE 8

| Fields | Bits | Contents |
|---|---|---|
| NSS | 1 bit | 0: 1 spatial stream<br>1: 2 spatial stream |
| Midamble periodicity | 1 bit | If NSS is set to 0<br>0: 4/5<br>1: 8/10<br>If Nss is set to 1<br>0: 3/3/4<br>1: 5/6/6 |

Referring to Table 8, an NSS-related field (hereinafter, an NSS field) may be set as 1-bit information. Based on the NSS field, the number of spatial streams may be set. For example, when the NSS field value is set to a first value (e.g., "0"), the number of spatial streams may be set to one. When the NSS field value is set to a second value (e.g., "1"), the number of spatial streams may be set to two.

A field related to a midamble periodicity (hereinafter, a midamble periodicity field) may also be set as 1-bit information. The midamble periodicity field may be set differently based on the NSS field.

For example, when the value of the NSS field is set to a first value (e.g., "0") and when the value of the NSS field is set to a second value (e.g., "1"), information set by the midamble periodicity field may be set differently.

For example, when the value of the NSS field is set to the first value and the periodicity field of the midamble is set to "0," the periodicity of the midamble may be set to 4 or 5 symbols. Also, when the value of the NSS field is set to the second value and the periodicity field of the midamble is set to "1," the periodicity of the midamble may be set to 8 or 10 symbols.

For example, when the value of the NSS field is set to the first value, the periodicity of the midamble may be set to 4 symbols or 8 symbols. As another example, when the value of the NSS field is set to the first value, the periodicity of the midamble may be set to 5 symbols or 10 symbols.

For example, when the value of the NSS field is set to the second value, the periodicity of the midamble may be set to 3 symbols or 4 symbols. As another example, when the value of the NSS field is set to the second value, the periodicity of the midamble may be set to 3 symbols or 6 symbols. As another example, when the value of the NSS field is set to the second value, the periodicity of the midamble may be set to 4 symbols or 6 symbols.

According to an embodiment, the periodicity information of the midamble may be set/configured as 2-bit information. In this case, information related to 2 streams (or 2 spatial streams) may be further included in the NGV-SIG. The periodicity of the midamble based on the 2-bit information may be set as shown in Table 9.

TABLE 9

| Bits | Contents |
| --- | --- |
| 00 | 3/3/3/3/4 |
| 01 | 4/4/5/5/8 |
| 10 | 5/6/5/6/16 |
| 11 | 8/8/10/10/reserved |

Referring to Table 9, the periodicity information of the midamble may be set/configured as 2-bit information.

For example, based on the 2-bit information, the periodicity of the midamble may be set to 3, 4, 5, or 8 symbols. As another example, based on the 2-bit information, the periodicity of the midamble may be set to one of 3, 4, 6, and 8 symbols. As another example, based on the 2-bit information, the periodicity of the midamble may be set to one of 3, 4, 6, and 8 symbols. As another example, based on the 2-bit information, the periodicity of the midamble may be set to one of 4, 8, and 16 symbols.

For example, when the second bit information is set to a first value (e.g., "00"), the periodicity of the midamble may be set to one of 3 and 4 symbols. As another example, when the second bit information is set to a second value (e.g., "01"), the periodicity of the midamble may be set to one of 4, 5, and 8 symbols. As another example, when the second bit information is set to a third value (e.g., "10"), the periodicity of the midamble may be set to one of 5, 6, and 16 symbols. As another example, when the second bit information is set to a fourth value (e.g., "11"), the periodicity of the midamble may be set to one of 8 and 10 symbols or reserved.

According to an embodiment, the NGV-LTF (or NGV-LTF field) may also be transmitted through various modes like the midamble. Accordingly, information related to the mode of the NGV-LTF may also be transmitted through the NGV-SIG. Information related to the mode of the NGV-LTF may be set in various ways. For example, information related to the mode of NGV-LTF may be set as 1-bit information. For example, when the 1-bit information is set to a first value (e.g., "0"), the NGV-LTF may be set to a normal LTF (e.g., 1×-LTF). For example, when the 1-bit information is set to a second value (e.g., "1"), NGV-LTF may be set to 2×-LTF or repeated 2×-LTF.

According to an embodiment, the NGV-LTF and the midamble may always be configured the same. In this case, information related to the NGV-LTF and the midamble may be indicated only by the indication of the NGV-LTF. Therefore, when the NGV-LTF and the midamble are configured in the same mode, the receiving STA may receive information related to the configuration (or mode) of the NGV-LTF and information related to the periodicity of the midamble through the NGV-SIG, thereby identifying/obtaining information related to the configuration and periodicity of the midamble. Information included in the NGV-SIG may be set in various ways.

For example, information related to the NGV-LTF field (or information related to the configuration of the NGV-LTF field) may be set as 1-bit information. The information related to the NGV-LTF field may include information related to the LTF format. For example, when the 1-bit information is set to a first value (e.g., "0"), it may be set to a normal LTF (e.g., 1×LTF). In other words, when the 1-bit information is set to the first value, the NGV-LTF field and the midamble may be configured as an LTF sequence with a second interval. In other words, 1-bit information may be set to a first value (e.g., "0"). The NGV-LTF field and the midamble may be set in a second format related to the LTF sequence of the second interval based on the 1-bit information.

When the 1-bit information is set to a second value (e.g., "1"), NGV-LTF may be set to 2×-LTF or repeated 2×-LTF. In other words, when the 1-bit information is set to a second value (e.g., "1"), the NGV-LTF field and the midamble may configured to be an LTF sequence of the first interval. In other words, the 1-bit information may be set to a second value (e.g., "1"). The NGV-LTF field and the midamble may be set in a first format related to the LTF sequence of the first interval based on the 1-bit information. The first interval may be set to twice the second interval.

Also, for example, information related to the periodicity of the midamble may be set as 1-bit information.

Second Embodiment

According to various embodiments, various midamble periodicities and configurations/formats/modes may be used based on channel conditions and the influence of Doppler. Accordingly, indications for the periodicity and configuration/format/mode of various midambles may be transmitted through the NGV-SIG in various ways. In other words, information related to the periodicity and configuration/format/mode of various midambles may be transmitted through the NGV-SIG in various ways.

According to an embodiment, information related to the periodicity of the midamble and the configuration (or format/mode) of the midamble may be indicated through an information field included in the NGV-SIG. In other words, information related to the periodicity of the midamble and the configuration of the midamble may be included in the information field included in the NGV-SIG.

Information related to the periodicity of the midamble and the configuration of the midamble may be simultaneously indicated through one combination. Hereinafter, an example in which information related to the periodicity of the midamble and the configuration of the midamble is indicated may be described.

An EHT STA should always support the Basic Safety message (BSM). In this case, the size of the message may consist of at least 300 bytes. In addition, the EHT STA may support up to 256 QAM to improve throughput. Therefore, when transmitting the EHT PPDU through 10 MHz, the EHT STA may transmit the EHT PPDU using up to 8 or 9 symbols. Since the EHT PPDU is transmitted including the midamble, the maximum midamble periodicity may be set to a value less than 8.

According to an embodiment, the information related to the midamble may be set/configured as one of 2 bits to 4 bits (or bit information). Hereinafter, when information related to the midamble is set/configured as 2, 3, and 4 bits (or bit-information), an example of the periodicity and configuration of the midamble based on the information related to the midamble may be described.

Example in which Information Related to the Midamble Consists of 2 Bits

A. When information related to the midamble consists of 2 bits, information bits (i.e., 2-bit information) may be set by a combination of two midamble periods and two or three pieces of configuration information.

A-i) Case 1

As a Midamble Periodicity (MP) of the midamble, 4 symbols (hereinafter, MP4) or 8 symbols (hereinafter, MP8) may be used. For example, when the channel condition is not good, MP4 may be used. As another example, when the channel condition is good, MP8 may be used. When MP8 is used, an effect of improving reception throughput can be achieved.

A-i)-1. When normal (hereinafter, N), 2×-compressed (hereinafter, 2CM) and repeated 2×-compressed (hereinafter, R2CM) are used as the composition of the midamble, information related to the midamble (2 bits) can be set as shown in Table 10.

TABLE 10

|  | bits | contents |
|---|---|---|
| Midamble periodicity and composition | 00 | N + MP4 |
|  | 01 | 2CM + MP4 |
|  | 10 | R2CM + MP4 |
|  | 11 | R2CM + MP8 |

A-i)-2. When N and R2CM are used as a composition of the midamble, information related to the midamble (2-bit information) may be set as shown in Tables 11 and 12.

TABLE 11

|  | bits | contents |
|---|---|---|
| Midamble periodicity and composition | 00 | N + MP4 |
|  | 01 | N + MP8 |
|  | 10 | R2CM + MP4 |
|  | 11 | R2CM + MP3 |

Referring to Table 11, the symbol length of the midamble may be set equal to the length of the data symbol regardless of the configuration of the midamble.

TABLE 12

|  | bits | contents |
|---|---|---|
| Midamble periodicity and composition | 00 | N + MP4 |
|  | 01 | R2CM + MP4 |
|  | 10 | R2CM + MP8 |
|  | 11 | Reserved |

Referring to Table 12, similarly to Table 11, the symbol length of the midamble may be set equal to the length of the data symbol regardless of the configuration of the midamble.

A-i)-3. When 2CM and R2CM are used as a composition of the midamble, information (2-bit information) about the midamble may be set as shown in Table 13.

TABLE 13

|  | bits | contents |
|---|---|---|
| Midamble periodicity and composition | 00 | 2CM + MP4 |
|  | 01 | 2CM + MP8 |
|  | 10 | R2CM + MP4 |
|  | 11 | R2CM + MP8 |

A-i)-4. When N and 2CM are used as a composition of the midamble, information related to the midamble (2-bit information) may be set as shown in Table 14.

TABLE 14

|  | bits | contents |
|---|---|---|
| Midamble periodicity and composition | 00 | N + MP4 |
|  | 01 | N + MP8 |
|  | 10 | 2CM + MP4 |
|  | 11 | 2CM + MP8 |

A-ii) Unlike the above example, 6 symbols (hereinafter, MP6) may be used instead of 8 symbols as the long midamble periodicity (long MP). Accordingly, the midamble can be transmitted using MP4 and MP6. Information related to the midamble (2-bit information) may be set as shown in the following tables.

A-ii)-1. When normal (hereinafter, N), 2×-compressed (hereinafter, 2CM) and repeated 2×-compressed (hereinafter, R2CM) are used as the composition of the midamble, information related to the midamble (2 bits) can be set as shown in Table 15.

TABLE 15

|  | bits | contents |
|---|---|---|
| Midamble periodicity and composition | 00 | N + MP4 |
|  | 01 | 2CM + MP4 |
|  | 10 | R2CM + MP4 |
|  | 11 | R2CM + MP6 |

A-ii)-2. When N and R2CM are used as a composition of the midamble, information related to the midamble (2-bit information) may be set as shown in Table 16.

TABLE 16

|  | bits | contents |
|---|---|---|
| Midamble periodicity and composition | 00 | N + MP4 |
|  | 01 | N + MP6 |
|  | 10 | R2CM + MP4 |
|  | 11 | R2CM + MP6 |

A-ii)-3. When 2CM and R2CM are used as a composition of the midamble, information related to the midamble (2-bit information) may be set as shown in Table 17.

TABLE 17

|  | bits | contents |
|---|---|---|
| Midamble periodicity and composition | 00 | 2CM + MP4 |
|  | 01 | 2CM + MP6 |
|  | 10 | R2CM + MP4 |
|  | 11 | R2CM + MP6 |

A-ii)-4. When N and 2CM are used as a composition of the midamble, information related to the midamble (2-bit information) may be set as shown in Table 18.

TABLE 18

|  | bits | contents |
|---|---|---|
| Midamble periodicity and composition | 00 | N + MP4 |
|  | 01 | N + MP6 |
|  | 10 | 2CM + MP4 |
|  | 11 | 2CM + MP6 |

A-iii) As in A-ii), the periodicity of the long midamble may be set to 10 symbols (hereinafter referred to as MP10) instead of 8 symbols. Accordingly, the midamble can be transmitted using MP4 and MP10. That is, in Tables 15 to 18, MP8 may be changed to MP10.

A-iv) As in A-ii), the periodicity of the short midamble may be set to 3 symbols (hereinafter referred to as MP3) instead of 4 symbols. Accordingly, the periodicity of the short midamble is set to MP3 for midamble transmission. That is, in the above tables, MP4 may be changed to MP3.

A-v) The periodicity values of the two midambles may be set to (3,6), (3,8), (3,5) or (5,10). Based on the above example, information about the midamble (2-bit information) may be set.

A-vi) The above-described information related to the midamble may be equally applied/configured irrespective of number of space-time streams (NSTS) or number of spatial streams (NSS).

A-vii) The information related to the midamble may be transmitted by changing the periodicity and configuration information of the midamble based on the NSTS. For example, when transmitting using 1 spatial stream and transmitting a signal using 2 spatial streams, MP and midamble configuration information for supporting reliable performance may be set differently. Therefore, when 1 SS (Spatial Stream) is supported, that is, when the NSTS indicated by the NGV-SIG is 1, one of the information elements related to the above-described midamble is used to transmit the periodicity and configuration information of the midamble. When the NSTS indicated by the NGV-SIG is 2, information element different from the case where the NSTS is 1 may be used to transmit the periodicity and configuration information of the midamble. That is, the periodicity and configuration information of the midamble may be set differently based on the NSTS information (or the NSTS value) (or based on the number of Spatial Streams).

A-vii)-1. When NSTS=2, the Midamble Periodicity (MP) may be set in various ways. Hereinafter, an example of MP when NSTS=2 may be described.

A-vii)-1-a. MP=3 and/or 4
A-vii)-1-b. MP=2 and/or 3
A-vii)-1-c. When using A-vii)-1-a and A-vii)-1-b described above and NSTS=2, information related to the midamble may be set as shown in Table 19. Table 19 may show a case where MP=3 and/or 4 is set.

TABLE 19

|  | bits | Contents (NSTS = 1) | Contents (NSTS = 2) |
|---|---|---|---|
| Midamble periodicity and composition | 00 | N + MP4 | N + MP5 |
|  | 01 | 2CM + MP4 | 2CM + MP5 |
|  | 10 | R2CM + MP4 | R2CM + MP3 |
|  | 11 | R2CM + MP8 | R2CM + MP4 |

Referring to 19, the example of the information related to the midamble described in Table 19 may be just one example and may be set in various ways. As an example, the example of Table 19 may be equally applied to the other examples described above.

A-vii)-2. When NSTS=2, only one MP can be used. In this case, only a part of 2-bit information may be used for the information related to the midamble. That is, information related to the midamble may be configured/set as a part of 2-bit information. Table 20 may show an example of information related to the midamble for the above-described example.

TABLE 20

|  | bits | Contents (NSTS = 1) | Contents (NSTS = 2) |
|---|---|---|---|
| Midamble periodicity and composition | 00 | N + MP4 | N + MP3 |
|  | 01 | 2CM + MP4 | R2CM + MP3 |
|  | 10 | R2CM + MP4 | reserved |
|  | 11 | R2CM + MP8 | reserved |

Referring to Table 20, as a configuration of a midamble for 2 Spatial Stream (SS) transmission, (N and 2CM)/(2CM and R2CM)/(N and R2CM), etc. may be used. The example of the information related to the midamble described in Table 20 may be just one example, and may be set in various ways. As an example, the example of Table 20 may be equally applied to the other examples described above.

A-vii)-3. When NSTS=2, only one midamble configuration can be used. In this case, only a part of 2-bit information may be used for the information related to the midamble. That is, information related to the midamble may be configured/set as a part of 2-bit information. Table 21 may show an example of information related to the midamble for the above-described example.

TABLE 21

|  | bits | Contents (NSTS = 1) | Contents (NSTS = 2) |
|---|---|---|---|
| Midamble periodicity and composition | 00 | N + MP4 | N + MP3 |
|  | 01 | 2CM + MP4 | N + MP4 |
|  | 10 | R2CM + MP4 | reserved |
|  | 11 | R2CM + MP8 | reserved |

Referring to Table 21, a single configuration such as N, 2CM, or R2CM may be used as a configuration of a midamble for 2 Spatial Stream (SS) transmission. The example of the information related to the midamble described in Table 21 is just one example, and may be set in various ways. As an example, the example of Table 21 may be equally applied to the other examples described above.

A-viii) Unlike the above-described examples, information related to midambles can be configured/set by using the periodicity of three midambles and the configuration of one midamble.

A-viii)-1. The periodicity and type/configuration of the midamble may be set as follows.

A-viii)-1-a. 4, 6, and/or 8 are used as MP, and a normal LTF may be used as a configuration of the midamble. According to an embodiment, when DCM is used, LTF may be repeatedly transmitted.

A-viii)-1-b. 4, 6, and/or 10 are used as MP, and a normal LTF may be used as a configuration of the midamble. According to an embodiment, when DCM is used, LTF may be repeatedly transmitted.

Example in which Information Related to the Midamble Consists of 3 Bits

B. Case 2

According to an embodiment, information of the midamble may consist of 3 bits. The 3-bit information may be configured based on the periodicity and/or configuration information of various midambles. Hereinafter, an example in which the periodicity and configuration information of the midamble is set based on 3-bit information may be described. In this case, the following tables can be used regardless of the NSS.

B-1. When 3, 4, and/or 8 are used as the midamble periodicity (MP) and N, 2CM, and R2CM are used as the configuration of the midamble, information related to the midamble may be set as shown in Table 22.

TABLE 22

|  | bits | contents |
| --- | --- | --- |
| Midamble periodicity and composition | 000 | N + MP3 |
|  | 001 | N + MP4 |
|  | 010 | N + MP8 |
|  | 011 | 2CM + MP4 |
|  | 100 | 2CM + MP8 |
|  | 101 | R2CM + MP3 |
|  | 110 | R2CM + MP4 |
|  | 111 | R2CM + MP8 |

Referring to Table 22, an example of the information related to the midamble of Table 22 is exemplary, and information (3 bits) related to the midamble can be set through a combination of the midamble period and the midamble configuration set in B-1.

B-2. When 3, 5, and/or 8 are used as the midamble periodicity (MP), and N, 2CM, and/or R2CM are used as the configuration of the midamble, information related to the midamble may be set as shown in Table 23.

TABLE 23

|  | bits | contents |
| --- | --- | --- |
| Midamble periodicity and composition | 000 | N + MP3 |
|  | 001 | N + MP5 |
|  | 010 | N + MP8 |
|  | 011 | 2CM + MP3 |
|  | 100 | 2CM + MP5 |
|  | 101 | R2CM + MP3 |
|  | 110 | R2CM + MP5 |
|  | 111 | R2CM + MP8 |

Referring to Table 23, an example of the information related to the midamble of Table 23 is exemplary, and information (3 bits) related to the midamble can be set through a combination of the midamble periodicity (MP) and the midamble configuration set in B-2.

B-3. The configuration of the information related to the midamble according to the above-described example is exemplary, and the information related to the midamble may be configured by a combination of the midamble periodicity and configuration of the midamble proposed below.

B-3-a. For example, 4, 6, and/or 10 may be used as the midamble periodicity, and N, 2CM, and/or R2CM may be used as the configuration of the midamble.

B-3-b. For example, 4, 6, and/or 10 may be used as the midamble periodicity, and N, Repeated Normal LTF (RN), 2CM, and/or R2CM may be used as the configuration of the midamble.

B-3-c. For example, 4, 6, and/or 10 may be used as the midamble periodicity (MP), and N and/or a repeated normal LTF (RN) may be used as a configuration of the midamble.

B-3-d. For example, 4, 6, and/or 10 may be used as the midamble periodicity (MP), and N, repeated normal LTF (RN) and/or R2CM may be used as the configuration of the midamble.

B-3-e. For example, 4, 6, and/or 10 may be used as the midamble periodicity (MP), and N, Repeated Normal LTF (RN) and/or 2CM may be used as the configuration of the midamble.

B-3-f. For example, MP8 may be used instead of MP6 in the configurations of B-3-a to B-3-e described above.

B-4. MP8 may be used instead of MP10 in the configurations of B-3-a to B-3-e described above.

B-5,6. When 3, 4, 5, and/or 8 are used as the midamble periodicity (MP), and N, and/or R2CM is used as the configuration of the midamble, information related to the midamble may be set as shown in Table 24.

TABLE 24

|  | bits | contents |
| --- | --- | --- |
| Midamble periodicity and composition | 000 | N + MP3 |
|  | 001 | N + MP4 |
|  | 010 | N + MP5 |
|  | 011 | N + MP8 |
|  | 100 | R2CM + MP3 |
|  | 101 | R2CM + MP4 |
|  | 110 | R2CM + MP5 |
|  | 111 | R2CM + MP8 |

Referring to Table 24, an example of the information related to the midamble of Table 24 is exemplary, and information (3 bits) on the midamble can be set through a combination of the above-described midamble periodicity and the configuration of the midamble.

B-7. When 3, 4, 5, and/or 8 are used as the midamble periodicity (MP) and 2CM and/or R2CM are used as the configuration of the midamble, information related to the midamble may be set as shown in Table 25.

TABLE 25

|  | bits | contents |
| --- | --- | --- |
| Midamble periodicity and composition | 000 | 2CM + MP3 |
|  | 001 | 2CM + MP4 |
|  | 010 | 2CM + MP5 |
|  | 011 | 2CM + MP8 |
|  | 100 | R2CM + MP3 |
|  | 101 | R2CM + MP4 |
|  | 110 | R2CM + MP5 |
|  | 111 | R2CM + MP8 |

Referring to Table 25, an example of the information related to the midamble of Table 25 is exemplary, and information (3 bits) on the midamble can be set through a combination of the above-described midamble periodicity and the configuration of the midamble.

B-8. When 3, 4, 5, and/or 8 are used as the midamble periodicity (MP) and N and/or 2CM are used as the configuration of the midamble, information related to the midamble may be set as shown in Table 26.

TABLE 26

| | bits | contents |
|---|---|---|
| Midamble periodicity and composition | 000 | N + MP3 |
| | 001 | N + MP4 |
| | 010 | N + MP5 |
| | 011 | N + MP8 |
| | 100 | 2CM + MP3 |
| | 101 | 2CM + MP4 |
| | 110 | 2CM + MP5 |
| | 111 | 2CM + MP8 |

Referring to Table 26, an example of the information related to the midamble of Table 26 is exemplary, and information (3 bits) related to the midamble can be set through a combination of the above-described midamble periodicity (MP) and the configuration of the midamble.

B-9. Information related to the midamble may be set as follows through different MPs and different midamble compositions (hereinafter MCs) from the above-described example.

B-9-a. For example, 4, 6, 8, and/or 10 may be used for MP, and N and/or RN may be used for MC.

B-9-b. For example, 4, 6 and/or 10 may be used for MP, and N and/or RN may be used for MC.

B-9-c. For example, 4, 8, and/or 10 may be used for MP, and N and/or RN may be used for MC.

B-9-d. For example, 4, 6, and/or 8 may be used for MP, and N and/or RN may be used for MC.

B-9-e. The MP and MC described above are exemplary. For example, the same MP as B-9-a and B-9-b may be used, and the MC may be variously configured. For example, when the same MP as B-9-a and B-9-b is used, MC is (N, 2RCM), (N, 2CM), (RN, R2CM), and/or (N, 2CM, R2CM) and the like may be used.

B-10. According to an embodiment, a part of the bitmap for 3 bits may be classified into NSS=1 and NSS=2 to be used.

B-10-a. For example, 3 bits may represent 1 SS in [000~011]. In addition, 3 bits may represent 2 SSs in [100 to 111].

B-10-b. Based on B-10-a, information related to the midamble may be set as shown in Table 27.

TABLE 27

| | bits | contents |
|---|---|---|
| Midamble periodicity and composition | 000 | N + MP4 |
| | 001 | N + MP8 |
| | 010 | 2CM + MP4 |
| | 011 | 2CM + MP8 |
| | 100 | N + MP3 |
| | 101 | N + MP6 |
| | 110 | Reserved |
| | 111 | Reserved |

Referring to Table 27, according to an embodiment, information (3 bits) related to the midamble may indicate 1 SS in [000 to 011]. Also, information (3 bits) about the midamble may indicate 2 SSs in [100 to 111].

According to an embodiment, information related to the midamble (3 bits) may indicate 2 SSs in [000 to 011]. In addition, information (3 bits) related to the midamble may indicate 1 SS in [100 to 111].

An example of the information related to the midamble in Table 27 is exemplary, and information (3 bits) related to the midamble can be set through a combination of the midamble periodicity (MP) and the midamble composition (MC) described above.

B-10-c. As another example, in the above example, the configuration of the MP and the midamble based on the NSS may be set in various ways.

For example, when NSS=1, MP may be set to 3 and/or 5, and when NSS=2, MP may be set to 4 and/or 8.

As another example, when NSS=1, MP may be set to 3 and/or 5, and when NSS=2, MP may be set to 5 and/or 8.

Example in which Information Related to the Midamble Consists of 4 Bits

C. According to an embodiment, information related to the midamble may be composed of 4 bits. The 4-bit information may be configured based on the periodicity and configuration information of various midambles. Hereinafter, an example in which the periodicity and configuration information of the midamble is set based on 4-bit information may be described.

C-1. 4, 6, 8, and/or 10 may be used as the midamble periodicity (MP), and N, RN, 2CM, and/or R2CM may be used as the configuration of the midamble.

C-2. 4, 6, and/or 10 may be used as the midamble periodicity (MP), and N, RN, 2CM, and/or R2CM may be used as the configuration of the midamble.

C-3. 4, 8, and/or 10 may be used as the midamble periodicity (MP), and N, RN, 2CM, and/or R2CM may be used as the configuration of the midamble.

C-4. 4, 6, and/or 8 may be used as the midamble periodicity (MP), and N, RN, 2CM, and/or R2CM may be used as the configuration of the midamble.

C-5. A configuration method other than the above-described example may be used. For example, the same MPs as those of C-1 to C-4 described above may be used. In addition, MC may be used except for one of N, RN, 2CM, and R2CM. The MP and MC are used to configure information (4 bits) related to the midamble.

C-5-a. For example, when the MC does not use 2CM and uses the rest of the configuration, information related to the midamble may be configured as follows.

C-5-a-i) For example, 4, 6, 8, and/or 10 may be used as the midamble periodicity (MP), and N, RN, and/or R2CM may be used as the configuration of the midamble.

C-5-a-ii) For example, 4, 6, and/or 10 may be used as the midamble periodicity (MP), and N, RN, and/or R2CM may be used as the configuration of the midamble.

C-5-a-iii) For example, 4, 8, and/or 10 may be used as the midamble periodicity (MP), and N, RN, and/or R2CM may be used as the configuration of the midamble.

C-5-a-iv) For example, 4, 6, and/or 8 may be used as the midamble periodicity (MP), and N, RN, 2CM and/or R2CM may be used as the configuration of the midamble.

C-5-a-v) In the above examples, since the RN can be indicated through the MCS, information related to the midamble may be configured as follows. In other words, the MCS may include information related to the RN.

C-5-a-vi) For example, 4, 6, 8 and/or 10 may be used as the midamble periodicity (MP), and N, 2CM and/or R2CM may be used as the configuration of the midamble.

C-5-a-vii) For example, 4, 6, and/or 10 may be used as the midamble periodicity (MP), and N, 2CM, and/or R2CM may be used as the configuration of the midamble.

C-5-a-viii) For example, 4, 8, and/or 10 may be used as the midamble periodicity (MP), and N, 2CM, and/or R2CM may be used as the configuration of the midamble.

C-5-a-ix) For example, 4, 6, and/or 8 may be used as the midamble periodicity (MP), and N, 2CM and/or R2CM may be used as the configuration of the midamble.

C-5-b. The above-described information related to the midamble is exemplary, and may be equally applied to other embodiments.

C-6. The same MP as those of C-1 to C-4 described above is used, and only N and NR are used for MC, so that information related to the midamble may be configured/set.

Figure 27:
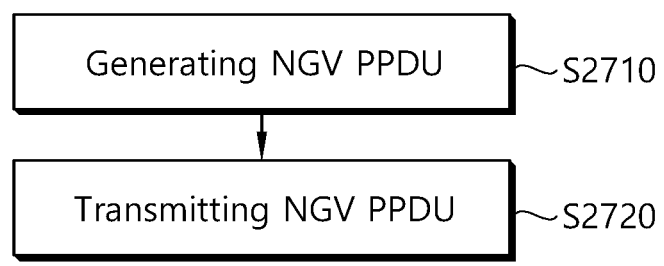
FIG. 27 is a flowchart illustrating an operation of a transmitting STA.

FIG. 27 is a flowchart illustrating an operation of a transmitting STA.

Referring to FIG. 27, in step S2710, a transmitting STA (e.g., STA 110 or 120 in FIG. 1) may generate/configure an NGV PPDU.

According to an embodiment, the NGV PPDU may include a preamble, a data field continuous to the preamble, and a midamble continuous to the data field. For example, the preamble may include a legacy signal field, a repeated signal field in which the legacy signal field is repeated, an NGV signal field including control information for an NGV PPDU, and an NGV LTF (long training field) for channel estimation of the NGV PPDU.

As an example, the legacy signal field may include L-SIG.

As an example, the repeated signal field may include the same information field as the legacy signal field. In addition, the repetition signal field may be modulated (e.g., BPSK) in the same manner as the legacy signal field. The repeat signal field may include RL-SIG.

As an example, the NGV signal field may be related to transmission information. The NGV signal field may include NGV-SIG.

According to an embodiment, the NGV signal field may include 1-bit information related to the format of the midamble and/or 2-bit information related to the transmission periodicity of the midamble.

According to an embodiment, the NGV signal field may include 1-bit information related to the format of the midamble.

For example, the format of the midamble may be determined as one of a first format related to an LTF sequence of a first interval and a second format related to an LTF sequence of a second interval. For example, the format of the midamble may be determined as one of a first format related to an LTF sequence of a first interval and a second format related to an LTF sequence of a second interval based on 1-bit information related to the format of the midamble.

As an example, 1-bit information related to the format of the midamble may be set as a first value (e.g., "1"). Based on 1-bit information related to the format of the midamble, the format of the midamble may be determined as the first format related to the LTF sequence of the first interval.

As an example, 1-bit information related to the format of the midamble may be set to a second value (e.g., "0"). Based on 1-bit information related to the format of the midamble, the format of the midamble may be determined as a second format related to the LTF sequence of the second interval.

In other words, for example, when the format of the midamble is set as the first format, the transmitting STA may set 1-bit information related to the format of the midamble as the first value. For another example, when the format of the midamble is set as the second format, the transmitting STA may set 1-bit information related to the format of the midamble to the second value.

According to an embodiment, the midamble may be configured based on any one of the LTF sequence of the first interval and the LTF sequence of the second interval. For example, the first interval may be set to twice the second interval. For example, non-zero element(s) of the LTF sequence of the first interval may be positioned based on two (2) subcarrier index intervals. For another example, non-zero element(s) of the LTF sequence of the second interval may be positioned based on one (1) subcarrier index interval.

For example, the LTF sequence of the first interval may be set based on available tones. As an example, the LTF sequence of the first interval may be configured based on the first interval within the available tones. The available tones may refer to tones excluding DC tones and guard tones from all tones within a bandwidth. Accordingly, in the LTF sequence of the first interval, DC tones (e.g., 1 tone or 3 tones) may be set to '0' (zero). Also, the available tones of the LTF sequence of the first interval may be set to non-zero at the first interval.

For example, the LTF sequence of the second interval may be set based on available tones. As an example, the LTF sequence of the second interval may be configured based on the second interval within the available tones. The available tones may refer to tones excluding DC tones and guard tones from all tones within a bandwidth. Accordingly, in the LTF sequence of the second interval, DC tones (e.g., 1 tone or 3 tones) may be set to '0' (zero). Also, the available tones of the LTF sequence of the second interval may be set to non-zero at the second interval.

According to an embodiment, the format of the midamble may be determined to be the same format as that of the NGV long training field (LTF).

For example, 1-bit information related to the format of the midamble may also indicate information related to the format of the NGV-LTF. Accordingly, 1-bit information related to the format of the midamble may indicate the format of the midamble and the NGV-LTF together. Also, the format of the midamble and the format of the NGV-LTF may be identically set. For example, when 1-bit information related to the format of the midamble is set to a first value (e.g., 1), the LTF sequence of the first interval may be used for the format of the midamble format and the NGV-LTF. When 1-bit information related to the format of the midamble is set to a second value (e.g., 0), the LTF sequence of the second interval may be used for the format of the midamble format and the NGV-LTF.

According to an embodiment, the NGV signal field may include 2-bit information related to the transmission periodicity of the midamble.

For example, the transmission periodicity of the midamble may be determined in unit(s) of symbols of the data field.

For example, the transmission periodicity of the midamble may be determined as one of a plurality of transmission periods based on 2-bit information related to the transmission periodicity of the midamble. As an example, for example, the transmission periodicity of the midamble may be determined as one of three transmission periods based on 2-bit information related to the transmission periodicity of the midamble. The three transmission periodicities may be set to 4, 8, and 16 symbols.

According to an embodiment, the subcarrier spacing of the NGV PPDU may be set to 156.25 kHz. Accordingly, one symbol length of the NGV PPDU may be set to 8 μs.

In step S2720, the transmitting STA may transmit an NGV PPDU. According to an embodiment, the transmitting STA may transmit an NGV PPDU to the receiving STA. According to an embodiment, the transmitting STA may transmit the NGV PPDU through a 5.9 GHz band.

Figure 28:
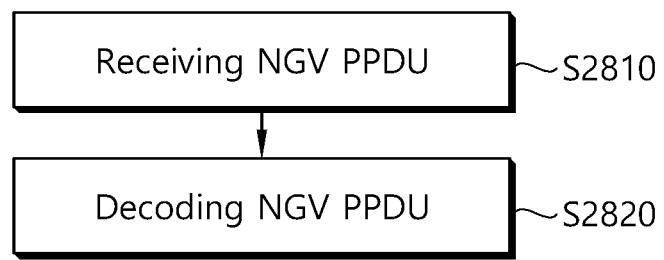
FIG. 28 is a flowchart illustrating an operation of a receiving STA.

FIG. 28 is a flowchart illustrating an operation of a receiving STA.

Referring to FIG. 28, in step S2810, a receiving STA (e.g., STA 110 or 120 in FIG. 1) may receive an NGV PPDU.

According to an embodiment, the NGV PPDU may include a preamble, a data field continuous to the preamble, and a midamble continuous to the data field. For example, the preamble may include a legacy signal field, a repeated signal field in which the legacy signal field is repeated, an NGV signal field including control information for an NGV PPDU, and an NGV LTF (long training field) for channel estimation of the NGV PPDU.

As an example, the legacy signal field may include L-SIG.

As an example, the repeated signal field may include the same information field as the legacy signal field. In addition, the repetition signal field may be modulated (e.g., BPSK) in the same manner as the legacy signal field. The repeat signal field may include RL-SIG.

As an example, the NGV signal field may be related to transmission information. The NGV signal field may include NGV-SIG.

According to an embodiment, the NGV signal field may include 1-bit information related to the format of the midamble and/or 2-bit information related to the transmission periodicity of the midamble.

According to an embodiment, the NGV signal field may include 1-bit information related to the format of the midamble.

For example, the format of the midamble may be determined as one of a first format related to an LTF sequence of a first interval and a second format related to an LTF sequence of a second interval. For example, the format of the midamble may be determined as one of a first format related to an LTF sequence of a first interval and a second format related to an LTF sequence of a second interval based on 1-bit information related to the format of the midamble.

As an example, 1-bit information related to the format of the midamble may be set as a first value (e.g., "1"). Based on 1-bit information related to the format of the midamble, the format of the midamble may be determined as the first format related to the LTF sequence of the first interval.

As an example, 1-bit information related to the format of the midamble may be set to a second value (e.g., "0"). Based on 1-bit information related to the format of the midamble, the format of the midamble may be determined as a second format related to the LTF sequence of the second interval.

For example, the receiving STA may check that the 1-bit information related to the format of the midamble is set as the first value. In this case, based on the 1-bit information related to the format of the midamble, the receiving STA may identify that the format of the midamble is the first format.

As another example, the receiving STA may check that the 1-bit information related to the format of the midamble is set to the second value. In this case, based on the 1-bit information regarding the format of the midamble, the receiving STA may identify that the format of the midamble is the second format.

According to an embodiment, the midamble may be configured based on any one of the LTF sequence of the first interval and the LTF sequence of the second interval. For example, the first interval may be set to twice the second interval. For example, non-zero element(s) of the LTF sequence of the first interval may be positioned based on two (2) subcarrier index intervals. For another example, non-zero element(s) of the LTF sequence of the second interval may be positioned based on one (1) subcarrier index interval.

For example, the LTF sequence of the first interval may be set based on available tones. As an example, the LTF sequence of the first interval may be configured based on the first interval within the available tones. The available tones may refer to tones excluding DC tones and guard tones from all tones within a bandwidth. Accordingly, in the LTF sequence of the first interval, DC tones (e.g., 1 tone or 3 tones) may be set to '0' (zero). Also, the available tones of the LTF sequence of the first interval may be set to non-zero at the first interval.

For example, the LTF sequence of the second interval may be set based on available tones. As an example, the LTF sequence of the second interval may be configured based on the second interval within the available tones. The available tones may refer to tones excluding DC tones and guard tones from all tones within a bandwidth. Accordingly, in the LTF sequence of the second interval, DC tones (e.g., 1 tone or 3 tones) may be set to '0' (zero). Also, the available tones of the LTF sequence of the second interval may be set to non-zero at the second interval.

According to an embodiment, the format of the midamble may be determined to be the same format as that of the NGV long training field (LTF).

For example, 1-bit information related to the format of the midamble may also indicate information related to the format of the NGV-LTF. Accordingly, 1-bit information related to the format of the midamble may indicate the format of the midamble and the NGV-LTF together. Also, the format of the midamble and the format of the NGV-LTF may be identically set. For example, when 1-bit information related to the format of the midamble is set to a first value (e.g., 1), the LTF sequence of the first interval may be used for the format of the midamble format and the NGV-LTF. When 1-bit information related to the format of the midamble is set to a second value (e.g., 0), the LTF sequence of the second interval may be used for the format of the midamble format and the NGV-LTF.

According to an embodiment, the NGV signal field may include 2-bit information related to the transmission periodicity of the midamble.

For example, the transmission periodicity of the midamble may be determined in unit(s) of symbols of the data field.

For example, the transmission periodicity of the midamble may be determined as one of a plurality of transmission periods based on 2-bit information related to the transmission periodicity of the midamble. As an example, for example, the transmission periodicity of the midamble may be determined as one of three transmission periods based on 2-bit information related to the transmission periodicity of the midamble. The three transmission periodicities may be set to 4, 8, and 16 symbols.

For example, the receiving STA may determine the midamble transmission periodicity based on the 2-bit information related to the midamble transmission period. For example, when the transmission periodicity of the midamble is set to "0", the transmitting STA may check/determine the transmission periodicity of the midamble as 4 symbols. For example, when the transmission periodicity of the midamble is set to "1", the transmitting STA may check/determine the transmission periodicity of the midamble as 8 symbols. For example, when the transmission periodicity of the midamble is set to "2", the transmitting STA may check/determine the transmission periodicity of the midamble as 16 symbols.

According to an embodiment, the subcarrier spacing of the NGV PPDU may be set to 156.25 kHz. Accordingly, one symbol length of the NGV PPDU may be set to 8 μs.

In step S2820, the receiving STA may decode the NGV PPDU. According to an embodiment, the receiving STA may decode the NGV PPDU based on the NGV signal field. For example, the receiving STA may decode the NGV PPDU based on the 1-bit information related to the format of the midamble and the 2-bit information related to the transmission periodicity of the midamble.

According to an embodiment, the receiving STA may identify information related to the midamble based on the NGV signal field. The receiving STA may check the format of the midamble based on the NGV signal field, and may decode the NGV PPDU based on the format. In addition, the receiving STA may check the transmission periodicity of the midamble based on the NGV signal field, and decode the NGV PPDU based on the confirmed transmission period.

The technical features of the present specification described above may be applied to various devices and methods. For example, the above-described technical features of the present specification may be performed/supported through the apparatus of FIGS. 1 and/or 19. For example, the technical features of the present specification described above may be applied only to a part of FIGS. 1 and/or 19. For example, the technical features of the present specification described above are implemented based on the processing chips 114 and 124 of FIG. 1, or implemented based on the processors 111 and 121 and the memories 112 and 122 of FIG. 1, or, may be implemented based on the processor 610 and the memory 620 of FIG. 19. For example, the apparatus of the present specification includes a memory, and a processor operatively coupled to the memory. The process may be configured to: generate a Next Generation V2X Physical Protocol Data Unit (NGV PPDU), wherein the NGV PPDU includes a preamble, a data field contiguous to the preamble, and a midamble contiguous to the data field, wherein the preamble includes a legacy signal field, a repeated signal field in which the legacy signal field is repeated, an NGV signal field including control information for the NGV PPDU, and an NGV long training field (LTF) for channel estimation of the NGV PPDU, wherein the NGV signal field includes 1-bit information related to a format of the midamble and 2-bit information related to a transmission periodicity of the midamble, wherein a format of the midamble is determined as one of a first format related to an LTF sequence of a first interval and a second format related to an LTF sequence of a second interval, wherein the format of the midamble is determined as a same format of the NGV LTF, wherein the transmission periodicity of the midamble is determined in a unit of symbols of the data field; and transmit the NGV PPDU.

The technical features of the present specification may be implemented based on a computer readable medium (CRM). For example, the CRM proposed by the present specification may store instructions performing operations comprising: generating a Next Generation V2X Physical Protocol Data Unit (NGV PPDU), wherein the NGV PPDU includes a preamble, a data field contiguous to the preamble, and a midamble contiguous to the data field, wherein the preamble includes a legacy signal field, a repeated signal field in which the legacy signal field is repeated, an NGV signal field including control information for the NGV PPDU, and an NGV long training field (LTF) for channel estimation of the NGV PPDU, wherein the NGV signal field includes 1-bit information related to a format of the midamble and 2-bit information related to a transmission periodicity of the midamble, wherein a format of the midamble is determined as one of a first format related to an LTF sequence of a first interval and a second format related to an LTF sequence of a second interval; wherein the format of the midamble is determined as a same format of the NGV LTF, wherein the transmission periodicity of the midamble is determined in a unit of symbols of the data field; and transmitting the NGV PPDU. The instructions stored in the CRM of the present specification may be executed by at least one processor. At least one processor related to CRM in the present specification may be the processors 111 and 121 or the processing chips 114 and 124 of FIG. 1, or the processor 610 of FIG. 19. Meanwhile, the CRM of the present specification may be the memories 112 and 122 of FIG. 1, the memory 620 of FIG. 19, or a separate external memory/storage medium/disk.

The above-described technical characteristics of the present specification may be applied to various applications or business models. For example, the UE, Terminal, STA, Transmitter, Receiver, Processor, and/or Transceiver, and so on, that are described in the present specification may be applied to vehicles that support autonomous driving or prior art vehicles that support autonomous driving.

Figure 29:
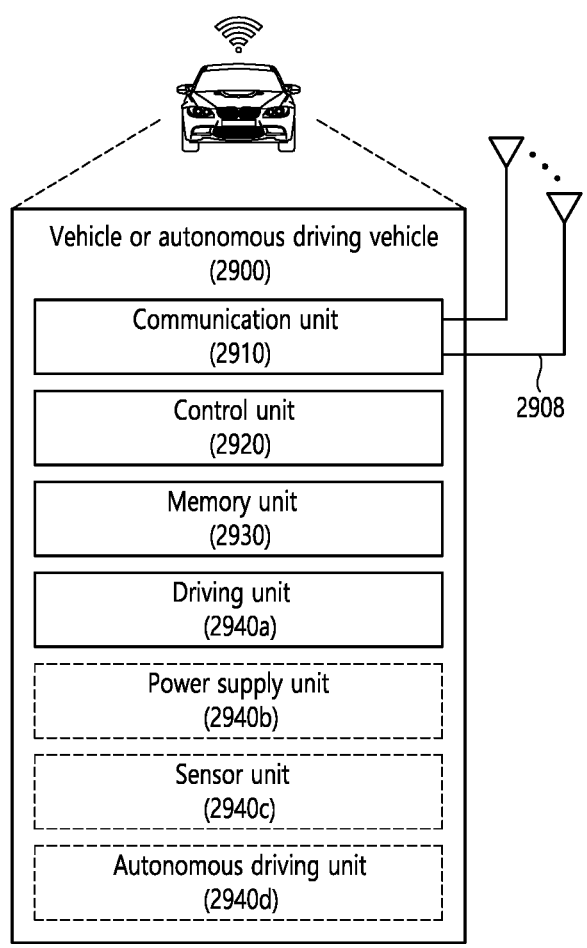
FIG. 29 shows a vehicle or an autonomous driving vehicle applied to the present specification.

FIG. 29 shows a vehicle or an autonomous driving vehicle applied to the present specification. The vehicle or autonomous driving vehicle may be implemented by a mobile robot, a car, a train, a manned/unmanned Aerial Vehicle (AV), a ship, and so on.

A memory unit 2930 shown in FIG. 29 may be included in the memory(s) 112, 122 shown in FIG. 1. Additionally, a communication unit 2910 shown in FIG. 29 may be include in the transceiver(s) 113, 123 and/or processor(s) 111, 121 shown in FIG. 1. Furthermore, the remaining devices that are shown in FIG. 29 may be included in the processor(s) 111, 121 shown in FIG. 1.

Referring to FIG. 29, a vehicle or autonomous driving vehicle 2900 may include an antenna unit 2908, a communication unit 2910, a control unit 2920, a memory unit 2930, a driving unit 2940*a*, a power supply unit 2940*b*, a sensor unit 2940*c*, and/or an autonomous driving unit 2940*d*. The antenna unit 2908 may be configured as a part of the communication unit 2910.

The communication unit 2910 may transmit and receive signals (e.g., data and control signals) to and from external devices such as other vehicles, BSs (e.g., gNBs and road side units), and servers. The control unit 2920 may perform various operations by controlling elements of the vehicle or the autonomous driving vehicle 2900. The control unit 2920 may include an Electronic Control Unit (ECU). The driving unit 2940*a* may cause the vehicle or the autonomous driving vehicle 2900 to drive on a road. The driving unit 2940*a* may include an engine, a motor, a powertrain, a wheel, a brake, a steering device, and so on. The power supply unit 2940*b* may supply power to the vehicle or the autonomous driving vehicle 2900 and include a wired/wireless charging circuit, a battery, and so on. The sensor unit 2940*c* may acquire a vehicle state, ambient environment information, user information, and so on. The sensor unit 2940*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 2940*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 2910 may receive map data, traffic information data, and so on, from an external server. The autonomous driving unit 2940*d* may generate an autonomous driving path and a driving plan from the obtained data. The control unit 2920 may control the driving unit 2940*a* such that the vehicle or the autonomous driving vehicle 2900 may move along the autonomous driving path according to the driving plan (e.g., speed/direction control). In the middle of autonomous driving, the communication unit 2910 may aperiodically/periodically acquire recent traffic information data from the external server and acquire surrounding traffic information data from neighboring vehicles. In the middle of autonomous driving, the sensor unit 2940*c* may obtain a vehicle state and/or surrounding environment information. The autonomous driving unit 2940*d* may update the autonomous driving path and the driving plan based on the newly obtained data/information. The communication unit 2910 may transfer information related to a vehicle position, the autonomous driving path, and/or the driving plan to the external server. The external server may predict traffic information data using AI technology, and so on, based on the information collected from vehicles or autonomous driving vehicles and provide the predicted traffic information data to the vehicles or the autonomous driving vehicles.

An example of the present specification includes an example of FIG. 39, which will hereinafter be described in detail.

Figure 30:
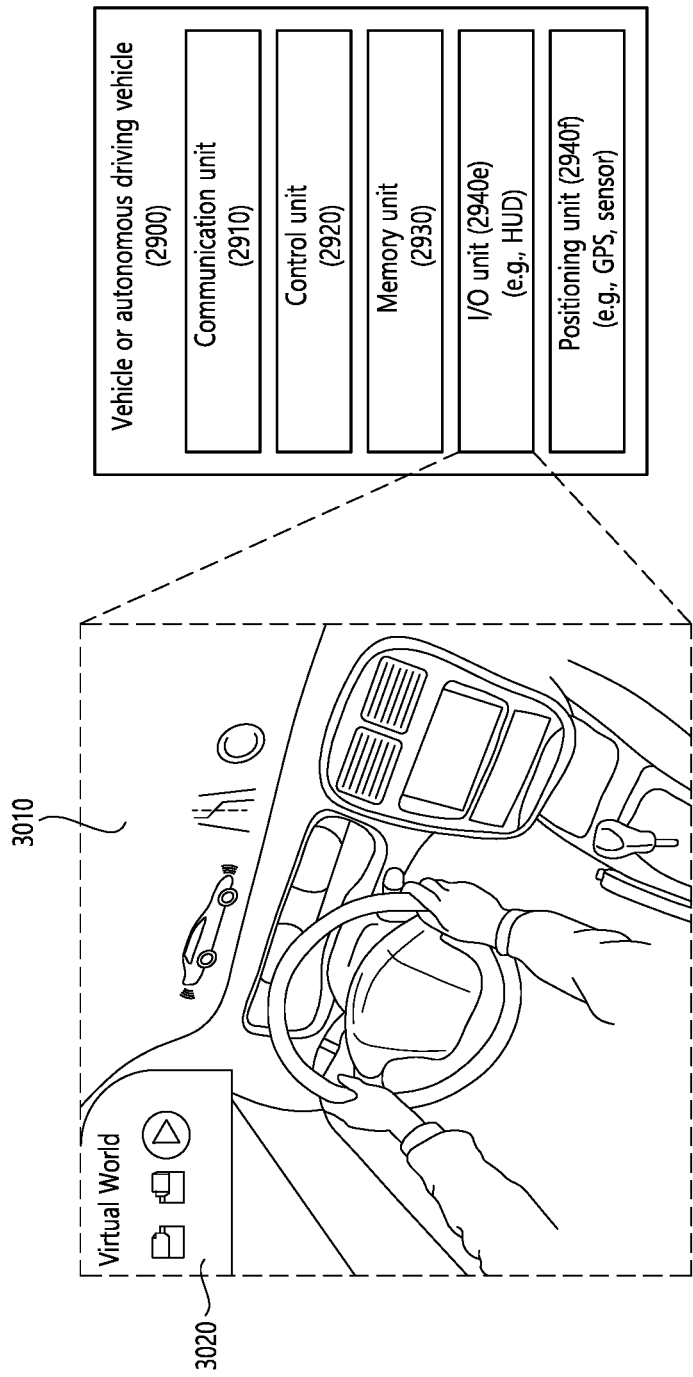
FIG. 30 shows an example of a vehicle that is applied to the present specification.

FIG. 30 shows an example of a vehicle that is applied to the present specification. The vehicle may be implemented as a transport means, an aerial vehicle, a ship, and so on.

Referring to FIG. 30, a vehicle 2900 may include a communication unit 2910, a control unit 2920, a memory unit 2930, an input/output (I/O) unit 2940*e*, and a positioning unit 2940*f*. Each block/unit/device shown in FIG. 30 may be the same as each block/unit/device shown in FIG. 29, respectively.

The communication unit 2910 may transmit and receive signals (e.g., data and control signals) to and from external devices such as other vehicles or BS s. The control unit 2920 may perform various operations by controlling constituent elements of the vehicle 2900. The memory unit 2930 may store data/parameters/programs/code/commands for supporting various functions of the vehicle 2900. The I/O unit 2940*e* may output an AR/VR object based on information within the memory unit 2930. The I/O unit 2940*e* may include a HUD. The positioning unit 2940*f* may acquire information related to the position of the vehicle 2900. The position information may include information related to an absolute position of the vehicle 2900, information related to the position of the vehicle 2900 within a traveling lane, acceleration information, and information related to the position of the vehicle 2900 from a neighboring vehicle. The positioning unit 2940*f* may include a GPS and various sensors.

As an example, the communication unit 2910 of the vehicle 2900 may receive map information and traffic information from an external server and store the received information in the memory unit 2930. The positioning unit 2940*f* may obtain the vehicle position information through the GPS and various sensors and store the obtained information in the memory unit 2930. The control unit 2920 may generate a virtual object based on the map information, traffic information, and vehicle position information and the I/O unit 2940*e* may display the generated virtual object in a window in the vehicle 2910, 2920. The control unit 2920 may determine whether the vehicle 2900 normally drives within a traveling lane, based on the vehicle position information. If the vehicle 2900 abnormally exits from the traveling lane, the control unit 2920 may display a warning on the window in the vehicle through the I/O unit 2940*e*. In addition, the control unit 2920 may broadcast a warning message regarding driving abnormity to neighboring vehicles through the communication unit 2910. According to situation, the control unit 2920 may transmit the vehicle position information and the information related to driving/vehicle abnormality to related organizations.

The foregoing technical features of this specification are applicable to various applications or business models.

For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a Wireless Local Area Network (WLAN) system, the method performed by a transmitting station (STA) and comprising:
    generating a Next Generation V2X Physical Protocol Data Unit (NGV PPDU),
    wherein a bandwidth of the NGV PPDU is 10 MHz, and a subcarrier spacing of the NGV PPDU is 156.25 kHz,
    wherein the NGV PPDU includes a preamble, a data field contiguous to the preamble, and a midamble contiguous to the data field,
    wherein the preamble includes a legacy long training field (LTF), a legacy signal field, a repeated legacy signal field in which the legacy signal field is repeated, an NGV signal field including control information for the NGV PPDU, a repeated NGV signal field in which the NGV signal field is repeated, and an NGV LTF for channel estimation of the NGV PPDU,
    wherein each of the legacy LTF, the legacy signal field, the repeated legacy signal field, the NGV signal field, and the repeated NGV signal field is contiguous with one another,
    wherein the legacy signal field is configured to be 24 bits, and the NGV signal field is configured to be 24 bits,
    wherein the NGV signal field includes 1-bit information related to a format of the midamble and 2-bit information related to a transmission periodicity of the midamble,
    wherein the 1-bit information is set as one of a first format related to a first LTF sequence or a second format related to a second LTF sequence,
    wherein the first LTF sequence is defined as {1, 0, 1, 0, −1, 0, 1, 0, −1, 0, −1, 0, 1, 0, 1, 0, 1, 0, −1, 0, 1, 0, 1, 0, 1, 0, 1, 0, 0, 0, −1, 0, 1, 0, −1, 0, −1, 0, −1, 0, −1, 0, −1, 0, 1, 0, −1, 0, −1, 0, −1, 0, 1, 0, 1, 0, −1},
    wherein the second LTF sequence is defined as {1, 1, 1, 1, −1, −1, 1, 1, −1, 1, −1, 1, 1, 1, 1, 1, 1, −1, −1, 1, 1, −1, 1, −1, 1, 1, 1, 1, 0, 1, −1, −1, 1, 1, −1, 1, −1, 1, −1, −1, −1, −1, −1, 1, 1, −1, −1, 1, −1, 1, −1, 1, 1, 1, 1, −1, −1},
    wherein a format of the midamble is determined as a same format of the NGV LTF,
    wherein the transmission periodicity of the midamble is determined in a unit of symbols of the data field; and
    transmitting the NGV PPDU.

2. The method of claim 1, the transmitting the NGV PPDU comprises:
    transmitting the NGV PPDU through a 5.9 GHz band.

3. The method of claim 1, wherein each of the first LTF sequence and the second LTF sequence is set based on available tones.

4. The method of claim 1, wherein the 1-bit information related to the format of the midamble is set as a first value,
    wherein the format of the midamble is determined, based on the 1-bit information related to the format of the midamble, to be the first format related to the first LTF sequence.

5. The method of claim 1, wherein the 1-bit information related to the format of the midamble is set as a second value,
    wherein the format of the midamble is determined, based on the 1-bit information related to the format of the midamble, to be the second format related to the second LTF sequence.

6. The method of claim 1, wherein the transmission periodicity of the midamble is determined as one of three transmission periodicities based on the 2-bit information related to the transmission periodicity of the midamble.

7. The method of claim 6, wherein the three transmission periodicities are set to 4, 8, or 16 symbols.

8. A method in a Wireless Local Area Network (WLAN) system, the method performed by a receiving station (STA) and comprising:
    receiving a Next Generation V2X Physical Protocol Data Unit (NGV PPDU),
    wherein a bandwidth of the NGV PPDU is 10 MHZ, and a subcarrier spacing of the NGV PPDU is 156.25 kHz,
    wherein the NGV PPDU includes a preamble, a data field contiguous to the preamble, and a midamble contiguous to the data field,
    wherein the preamble includes a legacy long training field (LTF), a legacy signal field, a repeated legacy signal field in which the legacy signal field is repeated, an NGV signal field including control information for the NGV PPDU, a repeated NGV signal field in which the NGV signal field is repeated, and an NGV LTF for channel estimation of the NGV PPDU, wherein each of the legacy LTF, the legacy signal field, the repeated legacy signal field, the NGV signal field, and the repeated NGV signal field is contiguous with one another, wherein the legacy signal field is configured to be 24 bits, and the NGV signal field is configured to be 24 bits, wherein the NGV signal field includes 1-bit information related to a format of the midamble and 2-bit information related to a transmission periodicity of the midamble, wherein the 1-bit information is set as one of a first format related to a first LTF sequence or a second format related to a second LTF sequence, wherein the first LTF sequence is defined as {1, 0, 1, 0, −1, 0, 1, 0, −1, 0, −1, 0, 1, 0, 1, 0, 1, 0, −1, 0, 1, 0, 1, 0, 1, 0, 1, 0, 0, 0, −1, 0, 1, 0, −1, 0, −1, 0, −1, 0, −1, 0, −1, 0, 1, 0, −1, 0, −1, 0, −1, 0, 1, 0, 1, 0, −1}, wherein the second LTF sequence is defined as {1, 1, 1, 1, −1, −1, 1, 1, −1, 1, −1, 1, 1, 1, 1, 1, 1, −1, −1, 1, 1, −1, 1, −1, 1, 1, 1, 1, 0, 1, −1, −1, 1, 1, −1, 1, −1, 1, −1, −1, −1, −1, 1, 1, −1, −1, 1, −1, 1, −1, 1, 1, 1, 1, −1, −1}, wherein a format of the midamble is determined as a same format of the NGV LTF, wherein the transmission periodicity of the midamble is determined in a unit of symbols of the data field; and decoding the NGV PPDU based on the 1-bit information related to the format of the midamble and the 2-bit information related to the transmission periodicity of the midamble.

9. A transmitting station (STA) in a Wireless Local Area Network (WLAN) system, the transmitting STA comprising:

a transceiver configured to transmit and/or receive a wireless signal; and a processor coupled to the transceiver, wherein the processor is configured to:

generate a Next Generation V2X Physical Protocol Data Unit (NGV PPDU), wherein a bandwidth of the NGV PPDU is 10 MHZ, and a subcarrier spacing of the NGV PPDU is 156.25 kHz, wherein the NGV PPDU includes a preamble, a data field contiguous to the preamble, and a midamble contiguous to the data field, wherein the preamble includes a legacy long training field (LTF), a legacy signal field, a repeated legacy signal field in which the legacy signal field is repeated, an NGV signal field including control information for the NGV PPDU, a repeated NGV signal field in which the NGV signal field is repeated, and an NGV LTF for channel estimation of the NGV PPDU, wherein each of the legacy LTF, the legacy signal field, the repeated legacy signal field, the NGV signal field, and the repeated NGV signal field is contiguous with one another, wherein the legacy signal field is configured to be 24 bits, and the NGV signal field is configured to be 24 bits, wherein the NGV signal field includes 1-bit information related to a format of the midamble and 2-bit information related to a transmission periodicity of the midamble, wherein the 1-bit information is set as one of a first format related to a first LTF sequence or a second format related to a second LTF sequence, wherein the first LTF sequence is defined as {1, 0, 1, 0, −1, 0, 1, 0, −1, 0, −1, 0, 1, 0, 1, 0, 1, 0, −1, 0, 1, 0, 1, 0, 1, 0, 1, 0, 0, 0, −1, 0, 1, 0, −1, 0, −1, 0, −1, 0, −1, 0, −1, 0, 1, 0, −1, 0, −1, 0, −1, 0, 1, 0, 1, 0, −1}, wherein the second LTF sequence is defined as {1, 1, 1, 1, −1, −1, 1, 1, −1, 1, −1, 1, 1, 1, 1, 1, 1, −1, −1, 1, 1, −1, 1, 1, 1, 1, 0, 1, −1, −1, 1, 1, −1, 1, −1, 1, −1, −1, −1, −1, 1, 1, −1, −1, 1, −1, 1, −1, 1, 1, 1, 1, −1, −1}, wherein a format of the midamble is determined as a same format of the NGV LTF, wherein the transmission periodicity of the midamble is determined in a unit of symbols of the data field; and transmit the NGV PPDU.

\* \* \* \* \*